US012391471B2

(12) United States Patent
Maroney et al.

(10) Patent No.: US 12,391,471 B2
(45) Date of Patent: Aug. 19, 2025

(54) REFUSE COLLECTION VEHICLE CONTROLS

(71) Applicant: The Heil Co., Chattanooga, TN (US)

(72) Inventors: Stanley L. Maroney, Attalla, AL (US); David G. Lewis, Chattanooga, TN (US); Robert B. Williams, Albertville, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/392,349

(22) Filed: Dec. 21, 2023

(65) Prior Publication Data

US 2024/0199322 A1    Jun. 20, 2024

Related U.S. Application Data

(63) Continuation of application No. 17/719,041, filed on Apr. 12, 2022, now Pat. No. 11,858,735, which is a continuation of application No. 16/857,056, filed on Apr. 23, 2020, now Pat. No. 11,453,550.

(60) Provisional application No. 62/837,576, filed on Apr. 23, 2019.

(51) Int. Cl.
*B65F 3/04*     (2006.01)
*B25J 13/08*    (2006.01)
*B65F 3/02*     (2006.01)

(52) U.S. Cl.
CPC ............. *B65F 3/041* (2013.01); *B25J 13/089* (2013.01); *B65F 2003/023* (2013.01)

(58) Field of Classification Search
CPC ......................... B65F 2003/023; B25J 19/089
See application file for complete search history.

(56) References Cited

U.S. PATENT DOCUMENTS

| 2,949,199 A | 8/1960 | Jones |
| 4,868,796 A | 9/1989 | Ahrens et al. |
| 5,004,392 A | 4/1991 | Naab |
| 5,007,786 A | 4/1991 | Bingman |
| 5,215,423 A | 6/1993 | Schulte-Hinsken et al. |

(Continued)

FOREIGN PATENT DOCUMENTS

| EP | 0214453 | 3/1987 |
| EP | 0955252 | 11/1999 |

(Continued)

OTHER PUBLICATIONS

Ihab S. Mohamed. Detection and Tracking of Pallets using a Laser Rangefinder and Machine Learning Techniques. Robotics [cs. RO]. 2017. hal-02557329 (Year: 2017).*

(Continued)

*Primary Examiner* — Jonathan Snelting
(74) *Attorney, Agent, or Firm* — Fish & Richardson P.C.

(57) ABSTRACT

A refuse collection vehicle includes a grabber that is operable to engage a refuse container, a lift arm that is operable to lift a refuse container, at least one sensor that is arranged to collect data indicating an angular position of the grabber, at least one sensor that is arranged to collect data indicating a relative positioning of the lift arm, a first controller for adjusting the angular position of the grabber, and a second controller adjusting the relative positioning of the lift arm. The adjustment of the angular position of the grabber is coordinated with the adjustment of the relative positioning of the lift arm.

14 Claims, 17 Drawing Sheets

(56) References Cited

U.S. PATENT DOCUMENTS

| | | |
|---|---|---|
| 5,601,392 A | 2/1997 | Smith et al. |
| 5,711,565 A | 1/1998 | Smith et al. |
| 5,755,547 A | 5/1998 | Flerchinger et al. |
| 5,762,461 A | 6/1998 | Fröhlingsdorf |
| 5,851,100 A | 12/1998 | Brandt |
| 5,863,086 A | 1/1999 | Christenson |
| 5,938,710 A | 8/1999 | Lanza et al. |
| 5,967,731 A | 10/1999 | Brandt |
| 6,004,092 A | 12/1999 | Johnson et al. |
| 6,152,673 A | 11/2000 | Anderson et al. |
| 6,476,855 B1 | 11/2002 | Yamamoto |
| 6,520,008 B1 | 2/2003 | Stragier |
| 7,070,382 B2 | 7/2006 | Pruteanu et al. |
| 7,072,745 B2 | 7/2006 | Pillar et al. |
| 7,219,769 B2 | 5/2007 | Yamanouchi et al. |
| 7,980,808 B2 | 7/2011 | Chilson et al. |
| 8,322,968 B1 | 12/2012 | Mizner |
| 8,753,062 B2 | 6/2014 | Curotto |
| 8,833,823 B2 | 9/2014 | Price et al. |
| 9,296,326 B1 | 3/2016 | Young |
| 9,403,278 B1 | 8/2016 | Van Kampen et al. |
| 9,580,014 B2 | 2/2017 | Lucas et al. |
| 9,926,135 B2 | 3/2018 | Whitfield, Jr. et al. |
| 10,048,398 B2 | 8/2018 | Rose et al. |
| 10,196,206 B2 | 2/2019 | Whitfield, Jr. et al. |
| 10,661,986 B2 | 5/2020 | Price et al. |
| 10,831,201 B2 | 11/2020 | Spence |
| 10,974,895 B2 | 4/2021 | McNeilus et al. |
| 11,318,885 B2 | 5/2022 | Phillips et al. |
| 11,453,550 B2 | 9/2022 | Maroney et al. |
| 11,603,265 B2 | 3/2023 | Williams et al. |
| 11,608,226 B2 | 3/2023 | Maroney et al. |
| 11,807,450 B2 | 11/2023 | Lewis et al. |
| 11,858,735 B2 | 1/2024 | Maroney et al. |
| 2002/0159870 A1 | 10/2002 | Pruteanu et al. |
| 2003/0031543 A1 | 2/2003 | Elbrink |
| 2006/0061481 A1 | 3/2006 | Kurple et al. |
| 2008/0089764 A1 | 4/2008 | Vistro |
| 2008/0199298 A1 | 8/2008 | Chilson et al. |
| 2009/0114485 A1 | 5/2009 | Eggert |
| 2009/0271058 A1 | 10/2009 | Chilson |
| 2013/0039728 A1 | 2/2013 | Price et al. |
| 2015/0093221 A1 | 4/2015 | Parker |
| 2016/0355335 A1 | 12/2016 | Whitfield, Jr. et al. |
| 2017/0243369 A1 | 8/2017 | Iida et al. |
| 2017/0362030 A1 | 12/2017 | Steimel |
| 2017/0369242 A1 | 12/2017 | McNeilus et al. |
| 2018/0134531 A1 | 5/2018 | Tanaka et al. |
| 2018/0319640 A1 | 11/2018 | Flenoid |
| 2018/0319642 A1 | 11/2018 | Pronger et al. |
| 2018/0346241 A1 | 12/2018 | Errington et al. |
| 2019/0135599 A1 | 5/2019 | Myers et al. |
| 2019/0225422 A1 | 7/2019 | Wrigley et al. |
| 2019/0325220 A1 | 10/2019 | Wildgrube et al. |
| 2020/0247609 A1 | 8/2020 | Maroney et al. |
| 2020/0339345 A1 | 10/2020 | Lewis et al. |
| 2020/0339346 A1 | 10/2020 | Maroney et al. |
| 2020/0339347 A1 | 10/2020 | Williams et al. |
| 2020/0342240 A1 | 10/2020 | Szoke-Sieswerda et al. |
| 2022/0106113 A1 | 4/2022 | Lewis et al. |
| 2022/0234822 A1 | 7/2022 | Maroney et al. |
| 2022/0258966 A1 | 8/2022 | Maroney et al. |
| 2023/0242336 A1 | 8/2023 | Maroney et al. |
| 2024/0034555 A1 | 2/2024 | Lewis et al. |

FOREIGN PATENT DOCUMENTS

| | | | |
|---|---|---|---|
| EP | 1020375 | 7/2000 | |
| EP | 3284704 | 2/2018 | |
| FR | 3045027 | 6/2017 | |
| JP | H09-208199 | 8/1997 | |
| JP | H09-210594 | 8/1997 | |
| JP | 2009-241247 | 10/2009 | |
| JP | 2016-068233 | 5/2016 | |
| JP | 2017-178567 | 10/2017 | |
| KR | 10-0846313 | 7/2008 | |
| WO | WO 2013055309 | 4/2013 | |
| WO | WO-2018009961 A1 * | 1/2018 | ............ B60Q 5/006 |
| WO | WO 2020163383 | 8/2020 | |

OTHER PUBLICATIONS

Office Action in European Appln. No. 20795932.1, mailed on Mar. 25, 2024, 7 pages.

EagleVisionSystems.com, "Bin-Seeker," 2017, retrieved from <http://eaglevisionsystems.com/EagleVision Bin-Seeker Datasheet.pdf>, 3 pages.

Eagle VisionSystems.com, "Vision Systems," Aug. 2015, retrieved from URL <http://eaglevisionsystems.com/vision.html>, 1 page.

EP Search Report in European Appln. No. 20752428.1, dated Feb. 25, 2022, 14 pages.

Extended European Search Report in European Appln. No. 20795932.1, dated May 13, 2022, 10 pages.

PCT International Search Report and Written Opinion in International Application No. PCT/US2020/016648, dated Jun. 3, 2020, 11 pages.

PCT International Search Report and Written Opinion in International Application No. PCT/US2020/029637, dated Jul. 24, 2020, 11 pages.

PCT International Search Report and Written Opinion in International Application No. PCT/US2020/029639, dated Jul. 29, 2020, 11 pages.

PCT International Search Report and Written Opinion in International Application No. PCT/US2020/029646, dated Jul. 29, 2020, 10 pages.

* cited by examiner

REFUSE COLLECTION VEHICLE CONTROLS

CROSS-REFERENCE TO RELATED APPLICATIONS

This application is a continuation of U.S. patent application Ser. No. 17/719,041, entitled "Refuse Collection Vehicle Controls," filed Apr. 12, 2022, which is a continuation of U.S. patent application Ser. No. 16/857,056, entitled "Refuse Collection Vehicle Controls," filed Apr. 23, 2020, now U.S. Pat. No. 11,453,550, which claims the benefit under 35 U.S.C. § 119(e) of U.S. patent application Ser. No. 62/837,576, entitled "Refuse Collection Vehicle Controls," filed Apr. 23, 2019, which are incorporated herein by reference in their entirety.

TECHNICAL FIELD

This disclosure relates to systems and method for operating a refuse collection vehicle to engage a refuse container.

BACKGROUND

Refuse collection vehicles have been used for generations for the collection and transfer of waste. Traditionally, collection of refuse with a refuse collection vehicle required two people: (1) a first person to drive the vehicle and (2) a second person to pick up containers containing waste and dump the waste from the containers into the refuse collection vehicle. Technological advantages have recently been made to reduce the amount of human involvement required to collect refuse. For example, some refuse collection vehicles include features that allow for collection of refuse with a single operator, such as mechanical or robotic lift arms.

SUMMARY

Many aspects of the disclosure feature operating a mechanical lift arm and grabber 113 to perform refuse collection.

In an example implementation, a refuse collection vehicle includes a grabber that is operable to engage a refuse container, a lift arm that is operable to lift a refuse container, at least one sensor that is arranged to collect data indicating an angular position of the grabber, at least one sensor that is arranged to collect data indicating a relative positioning of the lift arm, a first controller for adjusting the angular position of the grabber, and a second controller adjusting the relative positioning of the lift arm. The adjustment of the angular position of the grabber is coordinated with the adjustment of the relative positioning of the lift arm.

In an aspect combinable with the example implementations, the first controller includes one or more push buttons.

In another aspect combinable with any of the previous aspects, adjusting the angular position of the grabber includes manually engaging at least one of the one or more push buttons.

In another aspect combinable with any of the previous aspects, manually engaging at least one of the one or more push buttons adjusts the angular position of the grabber by an incremental amount.

In another aspect combinable with any of the previous aspects, the incremental amount is 5 degrees of angular movement.

In another aspect combinable with any of the previous aspects, the grabber is parallel to a surface on which the refuse collection vehicle is positioned when the grabber is positioned in a baseline angular position.

In another aspect combinable with any of the previous aspects, the angular position of the grabber can be adjusted using the first controller in a range of −30 degrees to 30 degrees relative to a surface on which the refuse collection vehicle is positioned.

Another aspect combinable with any of the previous aspects further includes an onboard computing device coupled to the at least one sensor arranged to collect data indicating an angular position of the grabber, the at least one sensor arranged to collect data indicating a relative positioning of the lift arm, the first controller, and the second controller.

In another aspect combinable with any of the previous aspects, coordinating the adjustment of the angular position of the grabber with the adjustment of the relative positioning of the lift arm includes determining, by the onboard computing device, a current relative positioning of the lift arm based on data provided by the at least one sensor arranged to collect data indicating a relative positioning of the lift arm, determining, by the onboard computing device, that the current relative positioning of the lift arm is below a threshold position, and in response to the determining that the current relative positioning of the lift arm is below a threshold position, modifying the range in which the angular position of the grabber can be adjusted using the first controller to a modified range.

In another aspect combinable with any of the previous aspects, the modified range includes −15 degrees to 30 degrees relative to the surface.

In another aspect combinable with any of the previous aspects, the modified range includes 0 degrees to 30 degrees relative to the surface.

In another aspect combinable with any of the previous aspects, the second controller includes a touch input display.

In another aspect combinable with any of the previous aspects, the second controller includes one or more control elements.

In another aspect combinable with any of the previous aspects, the relative positioning of the lift arm is adjusted by manually engaging at least one of the one or more control elements.

In another aspect combinable with any of the previous aspects, the relative positioning of the lift arm corresponds to a height of the grabber relative to a surface on which the refuse collection vehicle is positioned.

In another aspect combinable with any of the previous aspects, manually engaging at least one of the one or more control elements adjusts height of the grabber relative to a surface on which the refuse collection vehicle is positioned by an incremental amount.

In another aspect combinable with any of the previous aspects, the incremental amount is 2.5 inches.

In another aspect combinable with any of the previous aspects, at least one of the one or more control elements corresponds to a grabber height.

In another aspect combinable with any of the previous aspects, manually engaging at least one of the one or more control elements corresponding to a grabber height adjusts the relative positioning of the lift arm to a position corresponding to the grabber height.

In another aspect combinable with any of the previous aspects, at least one of the one or more control elements corresponds to a baseline positioning of the lift arm, and manually engaging the at least one of the one or more control elements corresponding to a baseline positioning adjusts the relative positioning of the lift arm to the baseline positioning.

In another aspect combinable with any of the previous aspects, the baseline positioning includes a relative positioning of the lift arm corresponding to a height of the grabber relative to a surface on which the refuse collection vehicle is positioned.

In another aspect combinable with any of the previous aspects, the baseline positioning includes a relative positioning of the lift arm corresponding to a height of the grabber equal to 24 inches above the surface on which the refuse collection vehicle is positioned.

In another aspect combinable with any of the previous aspects, the relative positioning of the lift arm can be adjusted using the second controller such that a height of the grabber relative to a surface that the refuse collection vehicle is on can be adjusted in a range of 39 inches above the surface to 20 inches below the surface.

Potential benefits of the one or more implementations described in the present specification may include increased waste collection efficiency and reduced operator error in refuse collection. The one or more implementations may also reduce the likelihood of damaging refuse containers and refuse collection vehicles during the refuse collection process. The one or more implementations may also reduce the risk of injury to refuse collection vehicle operators by reducing the need for the operators to exit the vehicle to physically interact with the refuse containers.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the subject matter described in this disclosure are set forth in the accompanying drawings and the description below. Other features, objects, and advantages of the subject matter will be apparent from the description and drawings, and from the claims.

DETAILED DESCRIPTION

Figure 1:
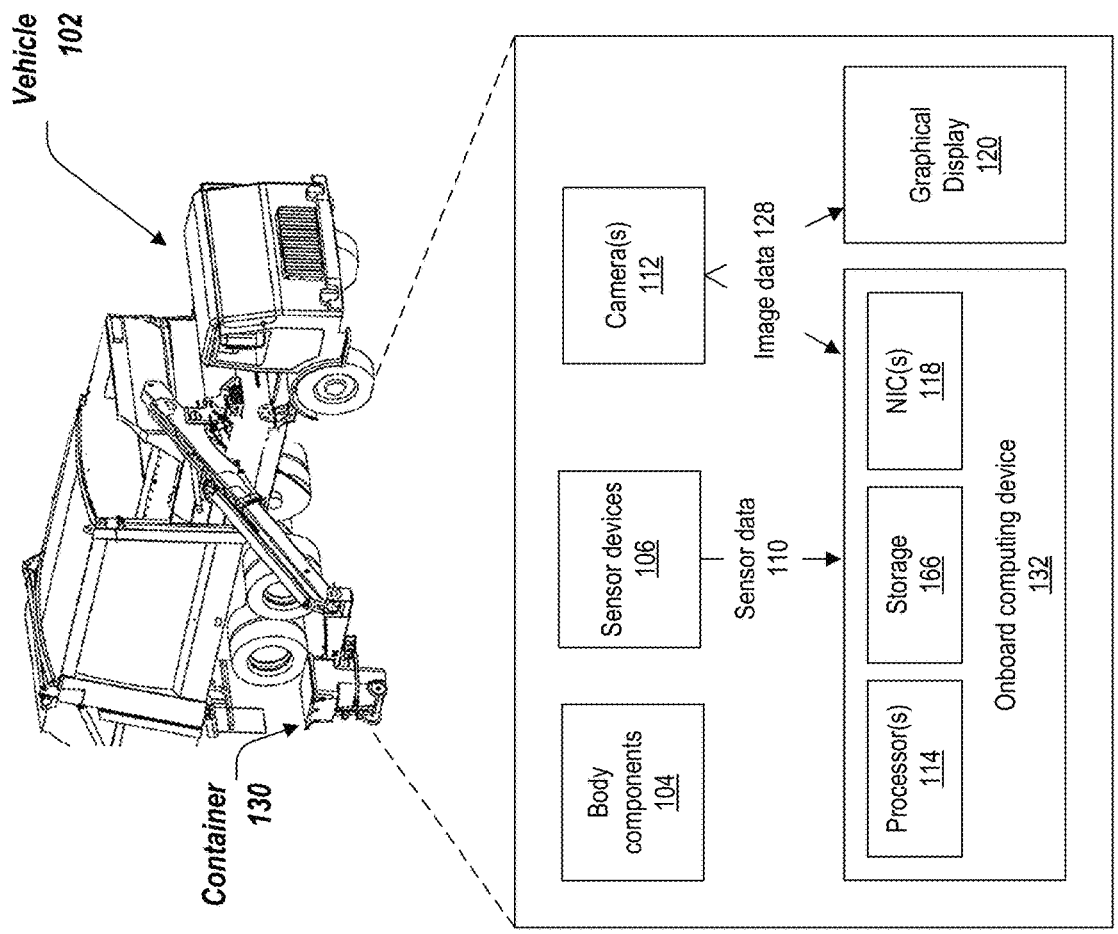
FIG. 1 depicts an example system for collecting refuse.

FIG. 1 depicts an example system for collecting refuse. Vehicle 102 is a refuse collection vehicle that operates to collect and transport refuse (e.g., garbage). The refuse collection vehicle 102 can also be described as a garbage collection vehicle, or garbage truck. The vehicle 102 is configured to lift containers 130 that contain refuse, and empty the refuse in the containers into a hopper of the vehicle 102, to enable transporting the refuse to a collection site, compacting of the refuse, and/or other refuse handling activities.

The body components 104 of the vehicle 102 can include various components that are appropriate for the particular type of vehicle 102. A vehicle with an automated side loader (ASL), such as the example shown in FIGS. 2A-2C, may include body components 104 involved in the operation of the ASL, such as an arm and/or grabbers, as well as other body components such as a pump, a tailgate, a packer, and so forth. Body components 104 may also include other types of components that operate to bring garbage into a hopper (or other storage area) of a truck, compress and/or arrange the garbage in the hopper, and/or expel the garbage from the hopper.

The vehicle 102 can include any number of body sensor devices 106 that sense body component(s) 104 and generate sensor data 110 describing the operation(s) and/or the operational state of various body components. The body sensor devices 106 are also referred to as sensor devices, or sensors. Sensors may be arranged in the body components, or in proximity to the body components, to monitor the operations of the body components. The sensors 106 emit signals that include the sensor data 110 describing the body component operations, and the signals may vary appropriately based on the particular body component being monitored. In some implementations, the sensor data 110 is analyzed, by a computing device on the vehicle and/or by remote computing device(s), to identify the presence of a triggering condition based at least partly on the operational state of one or more body components 104, as described in further detail below. Sensors 106 can include, but are not limited to, an analog sensor, a digital sensor, a CAN bus sensor, a magnetostrictive sensor, a radio detection and ranging (RADAR) sensor, a light detection and ranging (LIDAR) sensor, a laser sensor, an ultrasonic sensor, an infrared (IR) sensor, a stereo camera sensor, a three-dimensional (3D) camera, an in-cylinder sensor, or a combination thereof.

Sensors 106 can be provided on the vehicle body to evaluate cycles and/or other parameters of various body components. For example, as described in further detail herein, the sensors 106 can detect and measure the particular position or operational state of body components, such as the position of a lift arm 111 or the position of a grabber 113 of the vehicle 102.

In some implementations, the sensor data 110 may be communicated from the sensors to an onboard computing device 132 in the vehicle 102. In some instances, the onboard computing device is an under-dash device (UDU), and may also be referred to as the Gateway. Alternatively, the computing device 132 may be placed in some other suitable location in or on the vehicle. The sensor data 110 may be communicated from the sensors to the onboard computing device 132 over a wired connection (e.g., an internal bus) and/or over a wireless connection. In some implementations, a bus in conformance with International Organization of Standardization (ISO) standard 11898 connects the various sensors with the onboard computing device. In some implementations, a Controller Area Network (CAN) bus connects the various sensors with the onboard computing device. For example, a CAN bus in conformance with ISO standard 11898 can connect the various sensors with the onboard computing device. In some implementations, the sensors may be incorporated into the various body components. Alternatively, the sensors 106 may be separate from the body components. In some implementations, the sensors 106 digitize the signals that communicate the sensor data before sending the signals to the onboard computing device, if the signals are not already in a digital format.

The analysis of the sensor data 110 is performed at least partly by the onboard computing device 132, e.g., by processes that execute on the processor(s) 114. For example, the onboard computing device 132 may execute processes that perform an analysis of the sensor data 110 to determine the current position of the body components, such as the position of a lift arm and a grabber of the refuse collection vehicle 102. In some implementations, an onboard program logic controller or an onboard mobile controller perform analysis of the sensor data 110 to determine the current position of the body components 104.

The onboard computing device 132 can include one or more processors 114 that provide computing capacity, data storage 166 of any suitable size and format, and network interface controller(s) 118 that facilitate communication of the device 132 with other device(s) over one or more wired or wireless networks.

In some implementations, a vehicle includes a body controller that manages and/or monitors various body components of the vehicle. The body controller of a vehicle can be connected to multiple sensors in the body of the vehicle. The body controller can transmit one or more signals over a CAN network or aJ1939 network, or other wiring on the vehicle, when the body controller senses a state change from any of the sensors. These signals from the body controller can be received by the onboard computing device 132 that is monitoring the CAN network or the J1939 network.

In some implementations, the onboard computing device is a multi-purpose hardware platform. The device can include a UDU (Gateway) and/or a window unit (WU) (e.g., a device with cameras, speakers, and/or microphones) to record video and/or audio operational activities of the vehicle. The onboard computing device hardware subcomponents can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a global positioning system (GPS) chipset, a real-time clock, a micro SD card, an audio-video encoder and decoder chipset, and/or external wiring for CAN and for I/O. The device can also include temperature sensors, battery and ignition voltage sensors, motion sensors, CAN bus sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device is a smartphone, tablet computer, and/or other portable computing device that includes components for recording video and/or audio data, processing capacity, transceiver(s) for network communications, and/or sensors for collecting environmental data, telematics data, and so forth.

In some implementations, one or more cameras 112 can be mounted on the vehicle 102 or otherwise present on or in the vehicle 102. The camera(s) 112 each generate image data 128 that includes one or more images of a scene external to and in proximity to the vehicle 102. In some implementations, one or more cameras 112 are arranged to capture image(s) and/or video of a refuse container 130 before, after, and/or during the operations of body components 104 to engage and empty the refuse container 130. For example, for a side loading vehicle, the camera(s) 112 can be arranged to image objects to the side of the vehicle, such as a side that mounts the ASL to lift containers. In some implementations, camera(s) 112 can capture video of a scene external to, internal to, and in proximity to the vehicle 102.

Figure 2A:
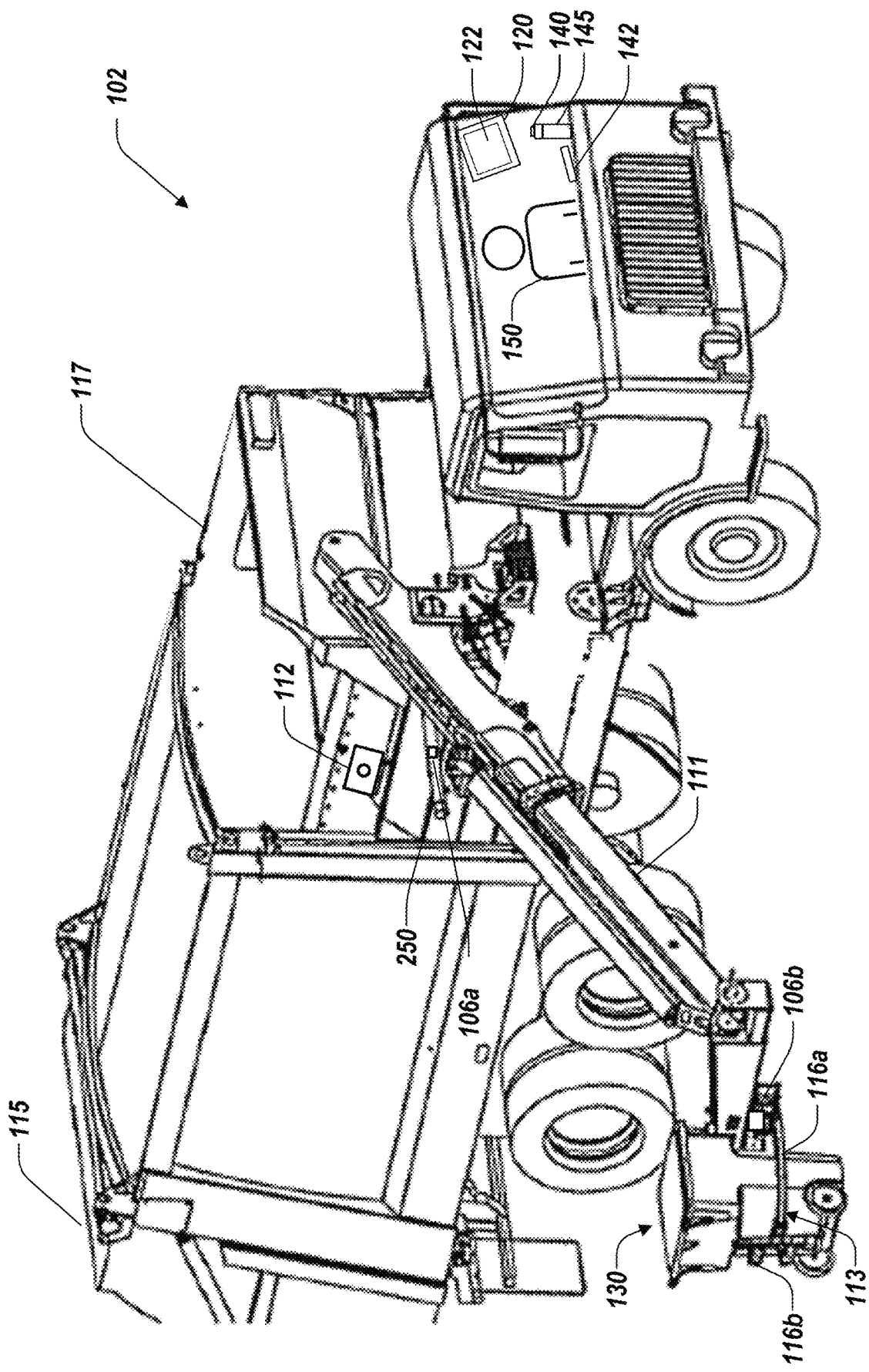
FIG. 2A-2C depict example schematics of a refuse collection vehicle.
Figure 2B:
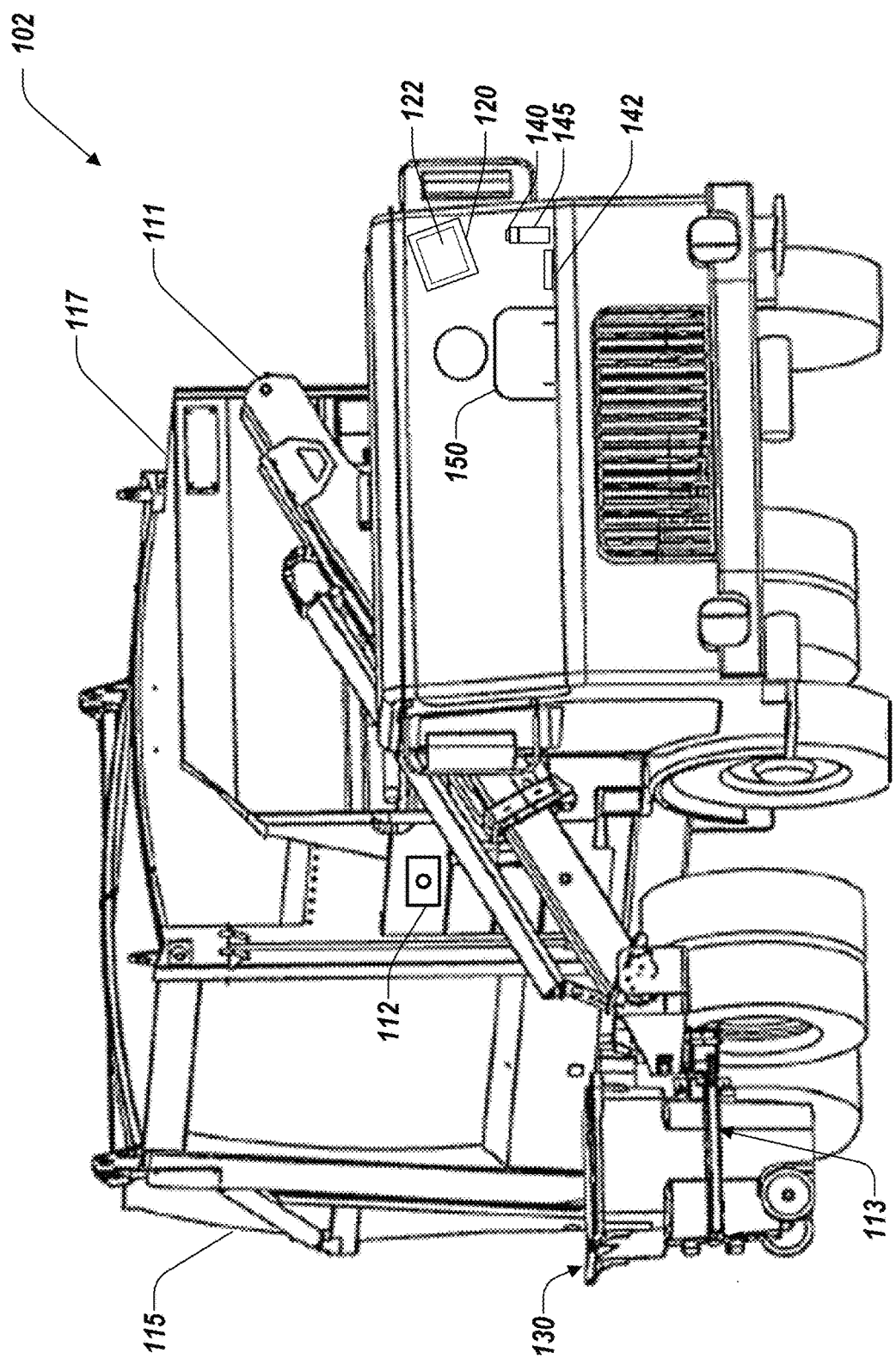
Figure 2C:
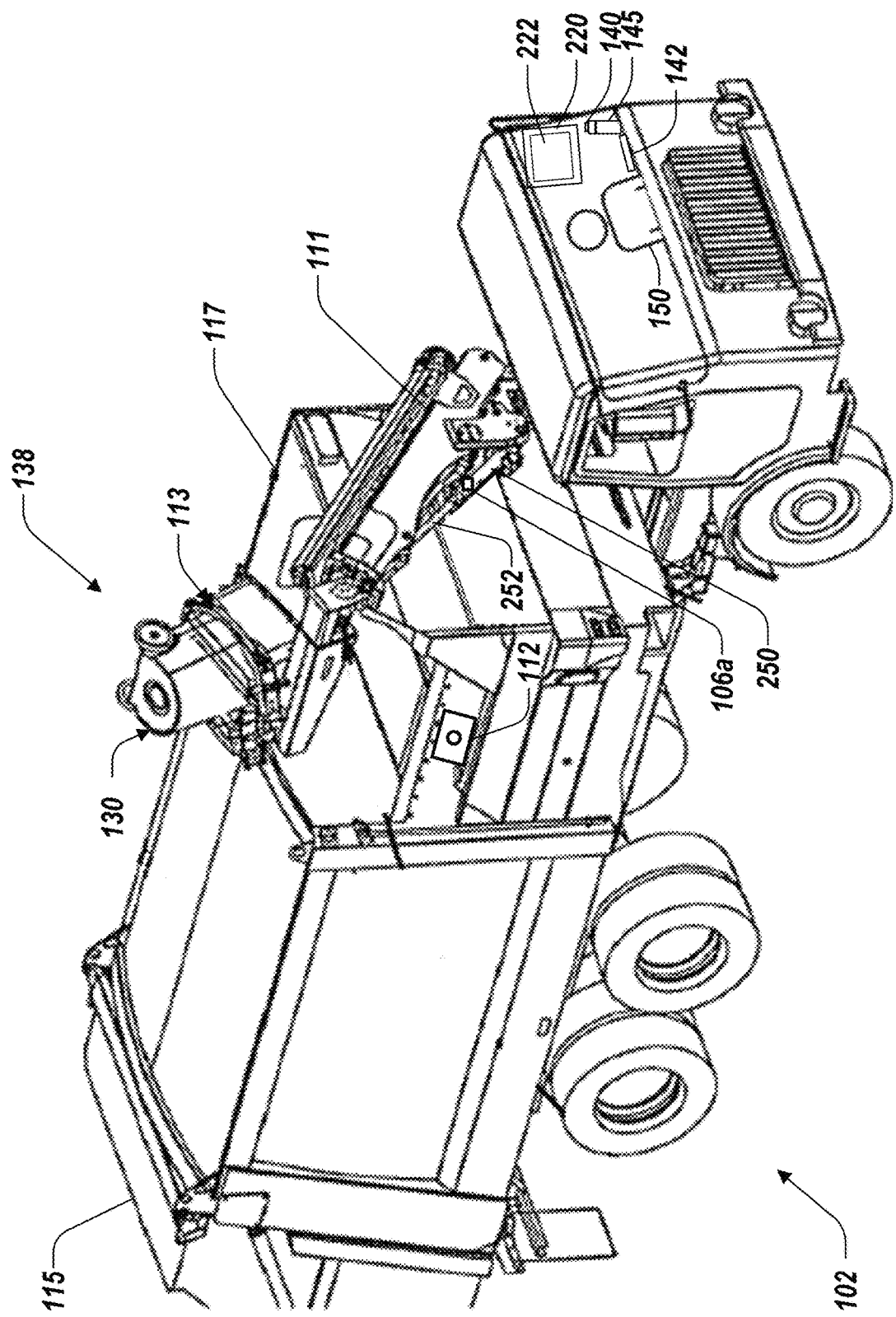

In some implementations, the camera(s) 112 are communicably coupled to a graphical display 120 to communicate images and/or video captured by the camera(s) 112 to the graphical display 120. In some implementations, the graphical display 120 is placed within the interior of the vehicle. For example, as depicted in FIGS. 2A-2C, the graphical display 120 can be placed within the cab of vehicle 102 such that the images and/or video can be viewed by an operator of the vehicle 102 on a screen 122 of the graphical display 120. In some implementations, the graphical display 120 is a heads-up display that projects images and/or video onto the windshield of the vehicle 102 for viewing by an operator of the vehicle 102.

In some implementations, the images and/or video captured by the camera(s) 112 can be communicated to the onboard computing device 132 in the vehicle 102. Images and/or video captured by the camera(s) 112 can be communicated from the camera(s) 112 to the onboard computing device 132 over a wired connection (e.g., an internal bus) and/or over a wireless connection. In some implementations, a J1939 bus or a CAN bus connects the camera(s) with the onboard computing device.

In some implementations, the camera(s) 112 are incorporated into the various body components. Alternatively, the camera(s) 112 may be separate from the body components.

FIGS. 2A-2C depict an example schematic of a refuse collection vehicle. The refuse collection vehicle 102 includes various body components including, but not limited to: a lift arm 111, a grabber 113, a back gate or tailgate 115, and a hopper 117 to collect refuse for transportation.

As depicted in FIGS. 2A-2C, the vehicle 102 also includes one or more cameras 112. In the examples shown in FIGS. 2A-2C, a camera 112 is positioned to visualize the environment proximate a side of the refuse collection vehicle 102, including a refuse container 130 to be engaged by the vehicle 102. The side view camera 112 can be aligned with a centerline of the grabber 113 to visualize a container 130 to be engaged by the grabber 113.

The side view camera 112 helps provide the vehicle operator 150 with a clear visual line of sight of a refuse container 130 located to the side of the vehicle 102. For example, images and/or video captured by camera 112 can be provided to a graphical display 120 for display on a screen 122 of the graphical display 120. As shown in FIGS. 2A-2C, a graphical display 120 is placed within the cab of vehicle 102 such that the images and/or video captured by camera 112 can be viewed on a screen 122 of the display 120 by the operator 150 of the vehicle 102. In some implementations, the graphical display 120 is a heads-up display that projects images and/or video captured by camera 112 onto the windshield of the vehicle 102 for viewing by an operator of the vehicle 102. In some implementations, the images and/or video captured by the camera 112 can be communicated to a graphical display 120 of an onboard computing device (such as onboard computing device 132 of FIG. 1) in the vehicle 102. Images and/or video captured by the camera 112 can be communicated to the graphical display 120, over a wired connection (e.g., an internal bus) and/or over a wireless connection. In some implementations, a J1939 bus or CAN bus connects the camera(s) with the onboard computing device. The ability to visualize the side of the vehicle 102 via the side view camera 112 and the screen 122 may be particularly useful when the refuse container 130 to be engaged is within close proximity of the vehicle 102.

In some implementations, the side view camera 112 is contained within an enclosure. For example, the camera 112 can be contained within a metal enclosure that also includes a light source. Placing the side view camera 112 in an enclosure can help protect the camera 112 from debris.

The vehicle 102 also includes a plurality of body sensors 106 positioned to determine the state and/or detect the operations of the body components 104. In the example shown in FIGS. 2A-2C, the vehicle 102 includes an arm position sensor 106a that is arranged to detect the relative position of the lift arm 111. For example, data provided by the arm position sensor 106a can be used to determine the height of an end of the lift arm 111 relative to the surface on which the vehicle 102 is positioned. In some examples, the sensor 106a for detecting the relative position of the lift arm 111 is coupled to a cylinder 250 that is coupled to the lift arm 111. For example, the sensor 106a can detect the relative position of the lift arm 111 based on the amount of travel of a piston 252 coupled to the lift arm 111 from the cylinder 250. In some implementations, arm position sensor 106a is located inside a cylinder 250 coupled to lift arm 111. In some implementations, position sensor 106a is located on the outside of a housing containing a cylinder 250 coupled to lift arm 111. In some examples, arm position sensor 106a includes two sensors, with a first sensor being located inside a cylinder used for raising the lift arm 111 and a second sensor being located inside a cylinder used for extending the lift arm 111. Body sensors 106 can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof.

The vehicle 102 also includes one or more grabber sensors 106b. The grabber sensor 106b can be arranged to detect the position and state of the grabber 113. For example, the grabber sensor 106b can be used to detect the relative position of the gripper arms 116a, 116b of the grabber 113. In some examples, the grabber sensor 106b detects a distance between the gripper arms 116a, 116. In some examples, data provided by the grabber sensor 106b can be used to determine an angle of the grabber 113 relative to the body of the vehicle 102. In some examples, data provided by the grabber sensor 106b can be used to determine the speed of movement of the gripper arms 116a, 116b of the grabber 113. In some implementations, the grabber sensor 106b can be used to determine the pressure being applied to a refuse container by the gripper arms 116a, 116b of the grabber 113.

Figure 3A:
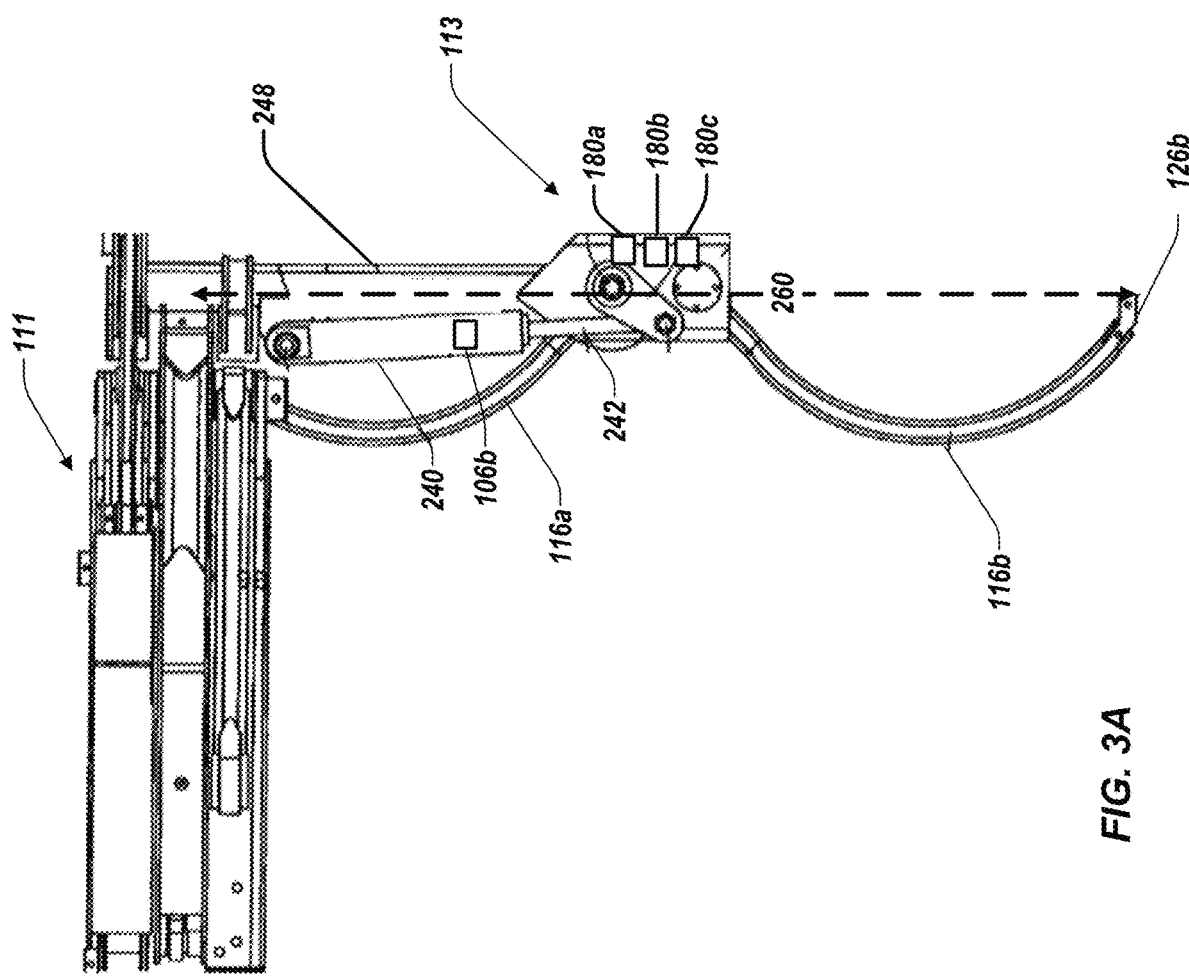
FIG. 3A-3C depict schematics of an example grabber of a refuse collection vehicle.
Figure 3B:
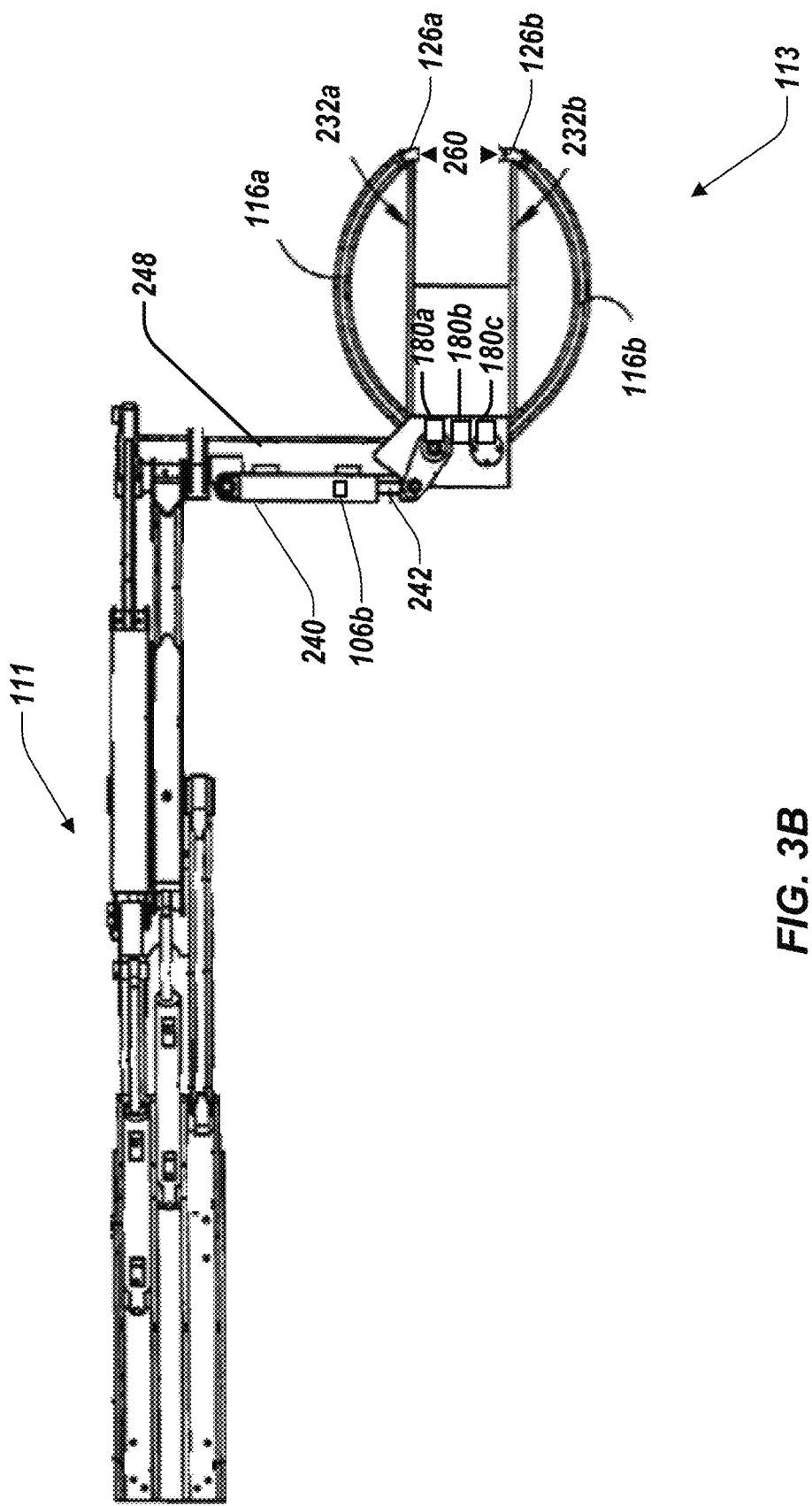
Figure 3C:
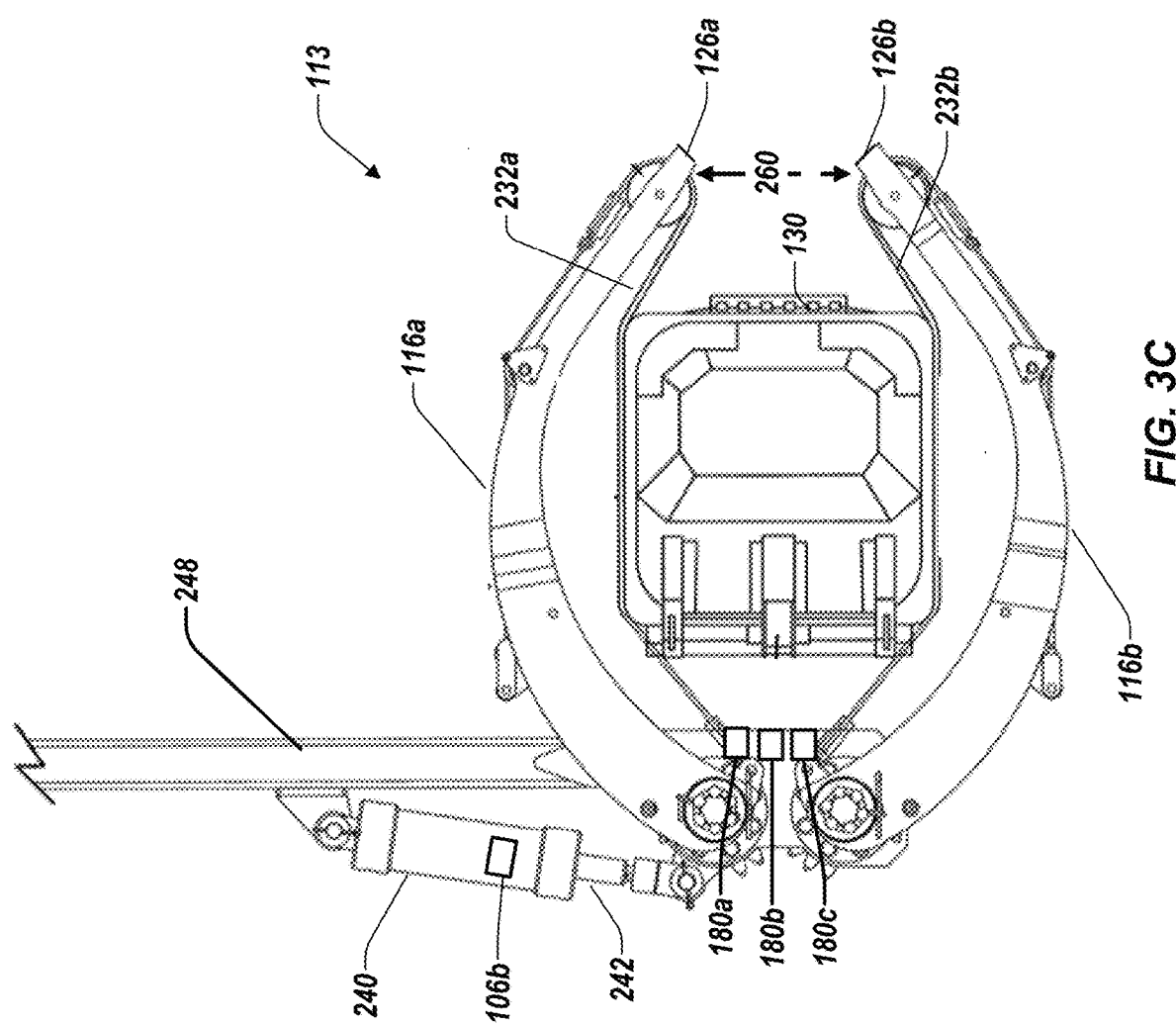

In some examples, the grabber sensor 106b includes one or more sensors positioned in one or more rotary actuators coupled to the grabber 113 and is configured to detect angular movement of the grabber 113. As shown in FIGS. 3A-3C, in some examples, the grabber sensor 106b is coupled to a cylinder 240 that is coupled to the grabber 113. For example, the sensor 106 can detect the relative position of the gripper arms 116a, 116b of the grabber 113 and the pressure being applied by the gripper arms 116a, 116b based on the amount of travel of a piston 242 coupled to the gripper arms 116, 116b from the cylinder 240. In some implementations, the grabber sensor 106b can detect the speed of travel of gripper arms 116a, 116b based on the rate of extension or retraction of a piston 242 coupled to the gripper arms 116, 116b from the cylinder 240. In some implementations, the grabber sensor(s) 106b for are located inside a cylinder 240 coupled to the grabber 113. In some implementations, the grabber sensor(s) 106b are located on the outside of a housing containing a cylinder 240 coupled to the grabber 113. Grabber position sensor(s) 106b for detecting the position of the gripper arms 116a, 116b can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof.

As depicted in FIGS. 2A-2C, one or more controls 140, 142, 145 are provided to control mechanical components of the vehicle. For example, as will be described in detail herein, controllers 140, 142 can be provided to control movement of the lift arm 111 and the grabber 113.

As shown in FIG. 2A, a refuse container 130 can be engaged by the grabber 113 of the refuse collection vehicle 102. The grabber 113 includes two gripper arms 116a, 116b that are configured to encapsulate and apply pressure to a refuse container 130 to engage the refuse container 130. As explained in further detail herein, the relative positioning of the lift arm 111 and of the grabber 113 can be adjusted to engage a refuse container 130.

As shown in FIG. 2A, engaging the refuse container 130 includes extending the lift arm 111 of the vehicle 102 outward from the vehicle 102 until the grabber 113 is in a position to engage the refuse container 130. Once the grabber 113 is in close proximity to the refuse container 130, the distance between the gripper arms 116a, 116b is reduced to engage and apply pressure to the refuse container 130. In some implementations, the one or more gripper arms 116a, 116b continue to move inward until a threshold pressure is applied to the refuse container. As described in further detail herein, the speed of travel of the gripper arms 116a, 116b and the pressure applied to the refuse container 130 by the gripper arms 116a, 116b can be adjusted using one or more controllers 140, 142. In some implementations, the pressure applied to the refuse container 130 by the gripper arms 116a, 116b is automatically adjusted based on feedback from one or more sensors. For example, one or more sensors may be configured to detect the changes in hydraulic pressure of the grabber 113, and, in response to the detected hydraulic pressure changes, the pressure applied to the refuse container 130 by the gripper arms 116a, 116b is automatically adjusted.

As depicted in FIGS. 2B and 2C, after the refuse container 130 is engaged by the grabber 113, the engaged refuse container 130 is lifted to a dump position 138 and the contents of the refuse container 130 are dumped into the hopper 117 of the refuse collection vehicle 102. The grabber 113 maintains the pressure applied by the gripper arms 116a, 116b to the refuse container 130 throughout the process of lifting the container 130 and dumping the contents of the container 130 to ensure that the container 130 is not prematurely dropped. In some implementations, the pressure provided by the gripper arms 116a, 116b is increased while the refuse container 130 is being rolled into a dump position 138.

After the contents of the engaged refuse container 130 are dumped into the hopper 117 of the refuse collection vehicle 102, the lift arm 111 is lowered to return the refuse container 130 to the ground (or to another surface on which the refuse container was positioned when initially engaged by the grabber 113). Once the refuse container 130 has been lowered to the ground or other placement surface, the gripper arms 116a, 116b move apart from one another to release the refuse container 130 from the grabber 113.

As previously discussed, the refuse collection vehicle 102 uses a grabber 113 to engage a refuse container 130 and uses a lift arm 111 to raise the engaged container 130 to release its contents into the hopper 117 of the vehicle 102. FIGS. 3A-3C depict top views of an example grabber 113. As depicted in FIG. 3A, the grabber 113 includes two opposing gripper arms 116a, 116b. In some examples, as depicted in FIGS. 3B and 3C, the grabber 113 also includes belts 232a, 232b attached to each the gripper arms 116a, 116b. The belts 232a, 232b allow for improved engagement between the grabber 113 and a refuse container 130 and allow for engagement of refuse containers 130 of various sizes. In some examples, belts 232 include one or more rubber belts. FIG. 3C depicts a refuse container 130 engaged by the grabber 113.

In some examples, an assembly including a cylinder 240 and a piston 242 move the gripper arms 116a, 116b between an open position (as depicted in FIG. 3A) to a closed or grabbing position (as depicted in FIG. 3B). For example, extension of the piston 242 from the cylinder 240 will cause the gripper arms 116a, 116b to move inward toward a closed position and reduce the distance 260 between the gripper arms 116a, 116b. Retraction of the piston 242 into the cylinder 240 causes the gripper arms 116a, 116b to move outward towards an open position and increase the distance 260 between the gripper arms 116a, 116b. In some examples, grabber sensor 106b is coupled to the cylinder 240 and measures the relative positioning of the gripper arms 116a, 116b based on the amount of extension of the piston 242 from the cylinder 240.

In some examples, controls (such as controls 140, 142 of FIG. 1) can be provided to control the movement of the gripper arms 116a, 116b of the grabber 113. For examples, control (such as controls 140, 142 of FIG. 1) can be provided to control the speed with which the gripper arms 116a, 116b move between an open position (as depicted in FIG. 3A) and a closed or grabbing position (as depicted in FIG. 3B).

In some implementations, the speed of gripper arm movement can be adjusted using a proportional push button control 140. For example, a proportional push button located in the cab of the vehicle can be used to proportionally adjust the speed of movement of the gripper arms 116a, 116b. The proportional button control 140 can be configured such that the speed with which the gripper arms 116a, 116b move between an open position and a closed position is adjusted proportionally with the amount of button 140 travel. For example, if the proportional button control 140 is depressed 50%, the speed of movement of the gripper arms 116a, 116b will be set to 50% of a maximum speed. If the proportional button control 140 is fully depressed, the gripper arms 116a, 116b will move between an open position and a closed position at a maximum speed. In some examples, the proportional button control 140 is communicably coupled to the cylinder 240 and piston 242 assembly coupled to the grabber 113 such that the proportional button control 140 controls the speed of extension and retraction of the piston 242 from the cylinder 240, which controls the speed of movement of the gripper arms 116a, 116b. In some examples, the proportional button control 140 is communicably coupled to the hydraulic system of the grabber 113 such that the proportional control 140 controls the hydraulic flow to the grabber 113, which controls the speed of gripper arm 116a, 116b movement. In some implementations, proportional push button control 140 is communicably coupled to an onboard computing device (such as onboard computing device 132 of FIG. 1.) For example, proportional push button control 140 may communicate with onboard computing device 132 over a J1939 network or over a CAN network.

In some examples, the proportional button control 140 for controlling gripper arm speed is integrated into a joystick controller 145. In some examples, the joystick controller 145 is used to control movement of the lift arm 111 of the vehicle. In some examples, the proportional button control 140 for grabber arm speed is integrated into a dashboard of the cab of the refuse collection vehicle. In some examples, the proportional button control 140 for gripper arm speed includes two proportional push buttons: a first button to adjust the speed of inward movement of the gripper arms 116a, 116b and a second button to adjust the speed of outward movement of the gripper arms 116a, 116b.

As the gripper arms 116a, 116b move inward to the engage and grasp a refuse container, as shown in FIG. 2C, the gripper arms 116a, 116b apply a pressure to the refuse container 130. In some examples, controllers (such as controllers 140, 142 of FIG. 2A-2C) are provided to control the pressure applied to the refuse can 130 by the gripper arms 116a, 116b. For example, the gripper arms 116a, 116b may be configured to apply a baseline pressure to a refuse container 130, and a controller 142 located within the vehicle 102 can be used to adjust the pressure applied by the gripper arms 116a, 116b to the refuse container 130.

Figure 4:
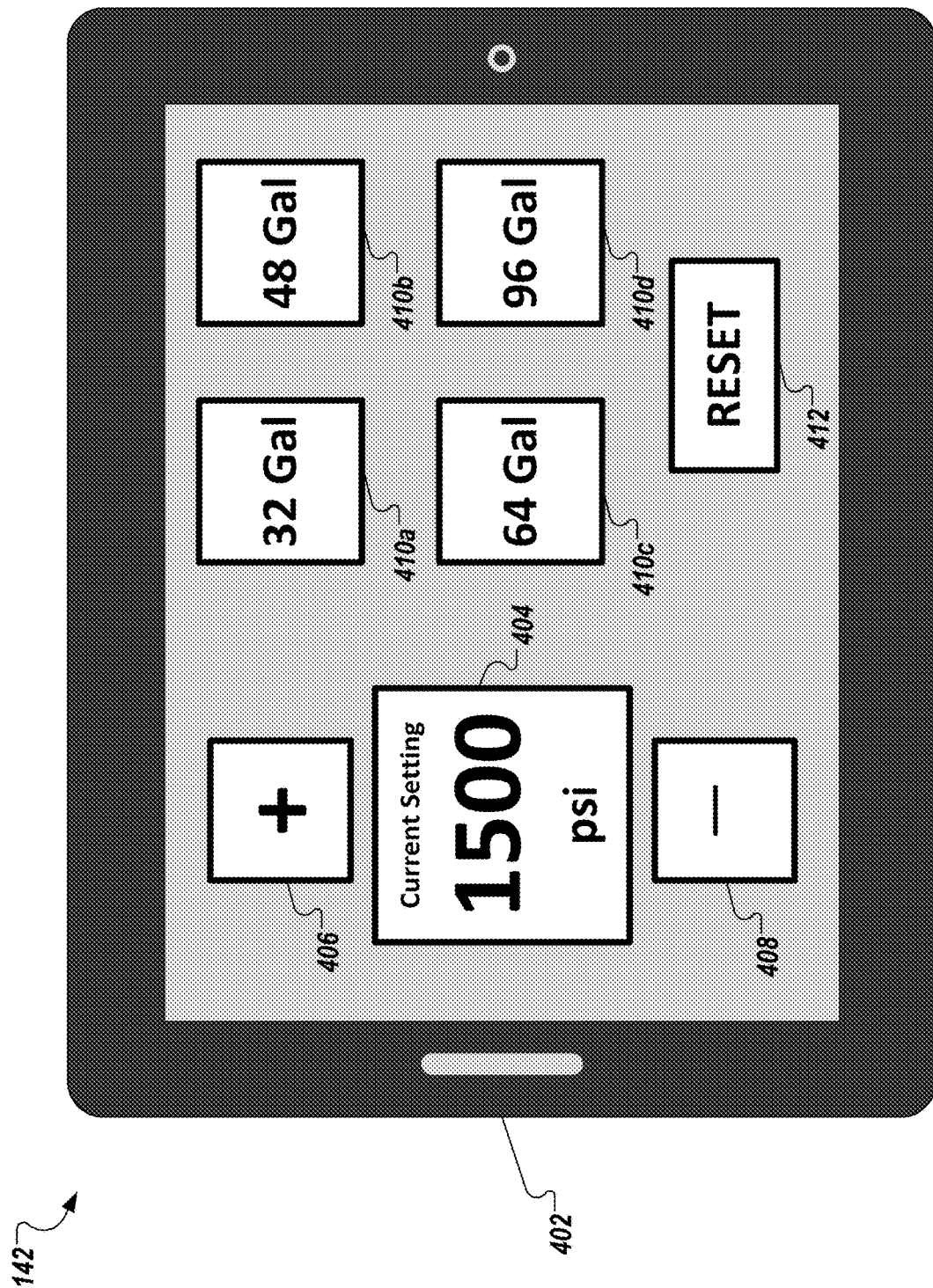
FIG. 4 depicts an example controller interface for controlling a grabber.

FIG. 4 depicts an example controller 142 for adjusting the pressure applied by the gripper arms 116a, 116b of the grabber 113. As depicted in FIG. 4, controller 142 may be provided as a touchscreen display 402 displaying a graphical user interface having one or more control elements 406, 408, 410, 412. Each of the control elements 406, 408, 410, 412 can be used to adjust the pressure provided by the gripper arms 116a, 116b of the grabber 113. As shown in FIG. 4, the GUI of the controller 142 also includes a control element 404 displaying the current pressure setting for the pressure provided by the gripper arms 116a, 116b.

The GUI of the controller 142 includes a first control element 406 for increasing the pressure to be applied by the gripper arms 116a, 116b on a refuse container. In some examples, each time an operator selects the first control element 406, the pressure to be applied by the gripper arms 116a, 116 is increased by a defined incremental amount. For example, if the incremental amount is 10 pounds per square inch (psi), an operator may increase the pressure to be applied by the gripper arms 116a, 116b by 30 psi by selecting the first control element 406 three times. In some examples, the pressure to be applied by the gripper arms 116a, 116b can be increased in increments in a range of 1 psi to 3000 psi using control element 406. In some examples, the pressure to be applied by the gripper arms 116a, 116b can be increased in increments of 10 psi using control element 406.

The GUI of the controller 142 includes a second control element 408 for decreasing the pressure to be applied by the gripper arms 116a, 116b on a refuse container. In some examples, each time an operator selects the second control element 408, the pressure to be applied by the gripper arms 116a, 116 is decreased by a defined incremental amount. For example, if the incremental amount is 10 psi, an operator may decrease the pressure to be applied by the gripper arms 116a, 116b by 30 psi by selecting the second control element 408 three times. In some examples, the pressure to be applied by the gripper arms 116a, 116b can be decreased in increments in a range of 1 psi to 3000 psi using control element 408. In some examples, the pressure to be applied by the gripper arms 116a, 116b can be decreased in increments of 10 psi using control element 408.

The controller 142 also includes control elements 410 for automatically adjusting the pressure to be applied by the gripper arms 116a, 116b based on a selected refuse container size. Control elements 410 each correspond to a particular size of refuse container, as defined by volume. For example, as depicted in FIG. 4, control element 410a corresponds to a 32-gallon refuse container, control element 410b corresponds to a 48-gallon refuse container, control element 410c corresponds to a 64-gallon refuse container, and control element 410d corresponds to a 96-gallon refuse container. Controller 142 can store a gripper pressure corresponding to each refuse container size associated with each control element 410. The stored pressure associated with each refuse container size can be equal to a pressure sufficient of maintain engagement between the grabber 113 and a fully loaded refuse container of the respective size.

In response to an operator's selection of one of control elements 410, the pressure to be applied by the gripper arms 116a, 116b is automatically adjusted to the stored gripper pressure associated with the selected control element 410. For example, if an operator selects control element 410c, the pressure to be applied by the gripper arms 116a, 116b will be automatically adjusted to the stored pressure associated with control element 410c.

As depicted in FIG. 4, the GUI of the controller 142 also includes a reset control element 412 that allows an operator to reset the pressure to be applied by the gripper arms 116a, 116b to a baseline pressure. In some implementations, the baseline pressure to be applied by the gripper arms 116a, 116b is in a range of 0 psi to 3000 psi. In some examples, the baseline pressure applied to the gripper arms 116a, 116b is 1200 psi. In some implementations, an operator 150 can adjust or set the baseline pressure using a controller, such as control elements 406 and 408. In response to an operator's selection of the reset control element 412, the pressure to be applied by the gripper arms 116a, 116b is automatically adjusted to the baseline pressure.

Control element 404 displaying the current setting of the pressure to be applied by the gripper arms 116a, 116b is automatically updated in response to each adjustment of the pressure to be applied by the gripper arms 116a, 116b. For example, if the current gripper arm pressure setting is 1250 psi, and the operator increases the pressure setting by 40 psi using control element 406, control element 404 will be updated to display 1290 psi as the current setting of the pressure to be applied by the gripper arms 116a, 116b.

The controller 142 can be used to adjust the pressure applied by the gripper arms 116a, 116b within a predetermined range. For example, controller 142 can be used to adjust the pressure applied by the gripper arms 116a, 116b between 0 psi and 3000 psi. In some implementations, controller 142 can be used to adjust the pressure applied by the gripper arms 116a, 116b between 1000 psi and 1800 psi In some examples, the one or more of the gripper arms 116a, 116b continue to move inward until the pressure selected by the operator using the controller 142 is applied to the refuse container 130 by the gripper arms 116a, 116b. In some examples, the pressure being applied to the gripper arms 116a, 116b is detected by a sensor 106b coupled to the cylinder 240 that is coupled to the grabber 113. In some implementations, the sensor 106b for detecting pressure applied by the gripper arms 116a, 116b is located in a cylinder 240 coupled to the grabber 113. In some implementations, the sensor 106b for detecting pressure applied by the gripper arms 116a, 116b is located on the outside of a housing containing a cylinder 240 coupled to the grabber 113. In some examples, pressure sensors 106b are arranged on each gripper arm 116a, 116b of the grabber 113 to detect the pressure being applied to a refuse container 130 by the gripper arms 116a, 116b. In some implementations, the sensor 106b for detecting pressure applied by the gripper arms 116a, 116b is located in the valve section of the grabber 113 that controls gripper movement. In some examples, the sensor 106b for detecting the pressure applied by the gripper arms 116a, 116b is located outside the valve section and within the grabber circuit. For example, the sensor 106b for detecting pressure applied by the gripper arms 116a, 116b may be located in a hydraulic hose connected to the grabber 113.

Figure 5:
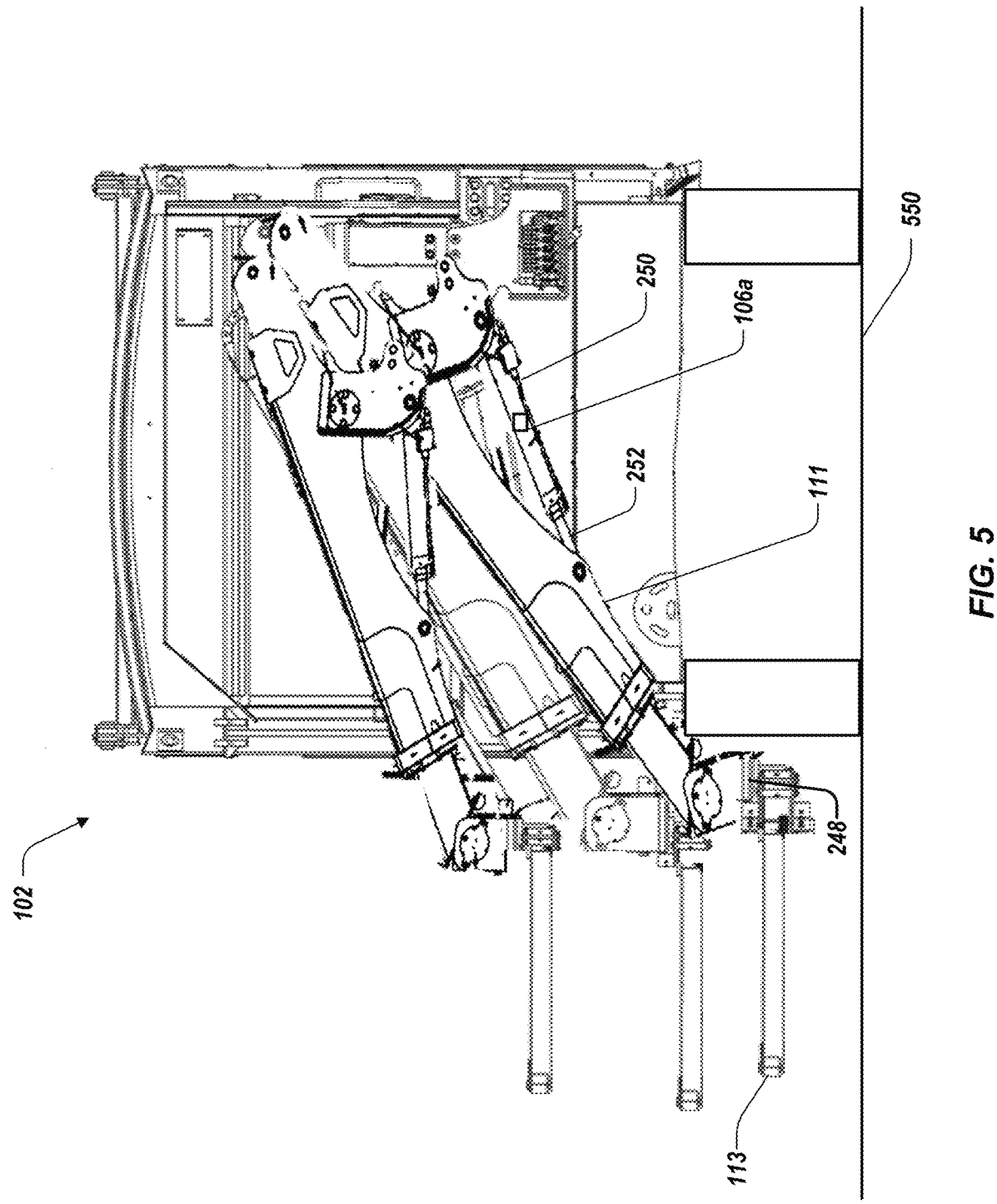
FIG. 5 depicts a schematic of an example lift arm and an example grabber of a refuse collection vehicle.

As depicted in FIG. 5, the height of the grabber 113 can be adjusted relative to the surface 550 that the vehicle 102 is positioned on by raising or lowering the lift arm 111. For example, as the lift arm 111 is raised, the grabber 113 is also raised.

The position of the lift arm 111 can be adjusted by a controller, such as controller 142, located within the refuse collection vehicle 102. For example, controller 142 located within the vehicle 102 can be used to adjust relative position of the lift arm 111.

Figure 6:
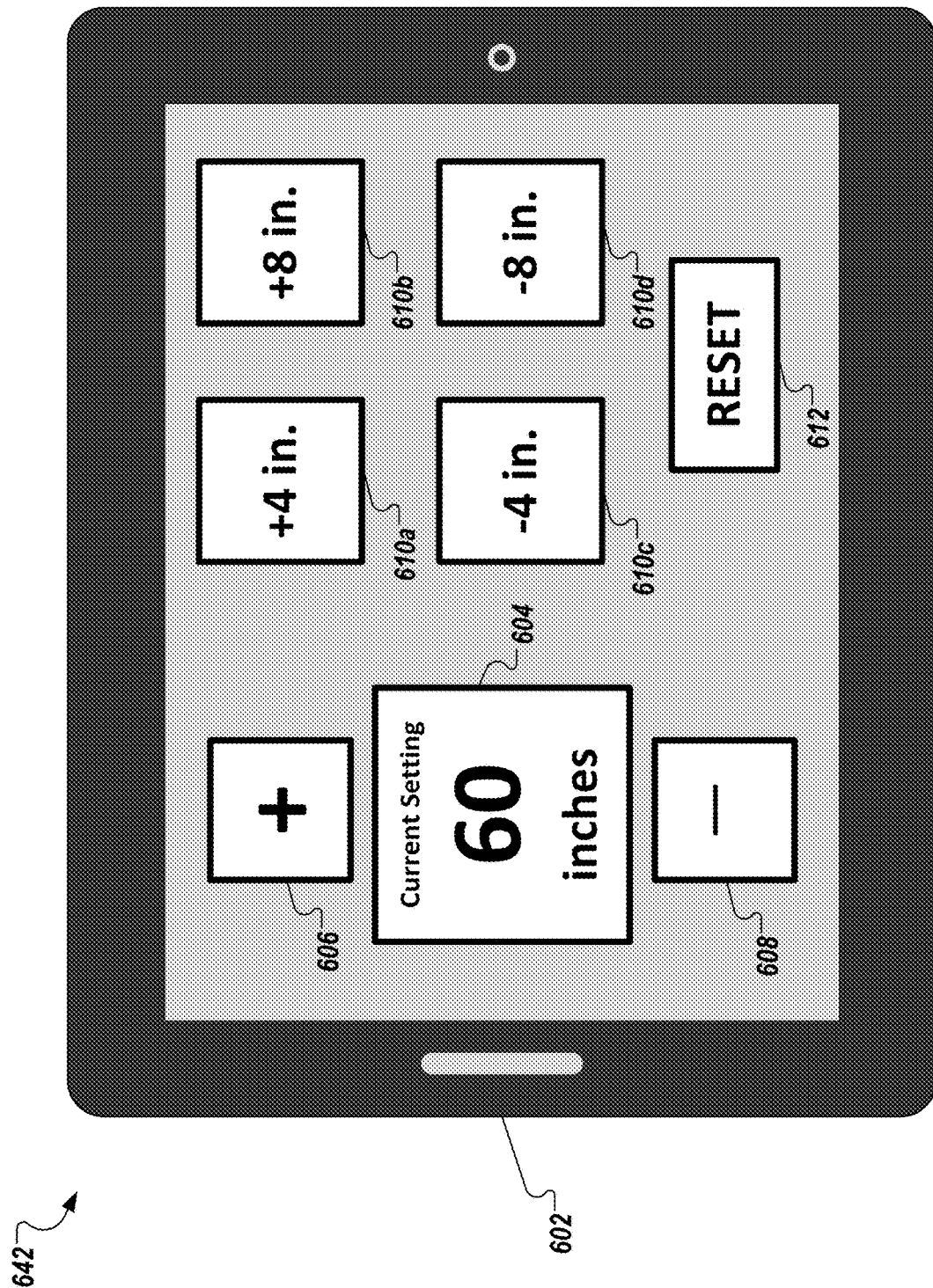
FIG. 6 depicts an example controller interface for controlling a lift arm.

FIG. 6 depicts an example controller 642 for controlling the relative positioning of the lift arm 111. As depicted in FIG. 6, the controller 642 may be provided as a touchscreen display 602 displaying a graphical user interface (GUI) having one or more control elements 606, 608, 610, 612. Each of the control elements 606, 608, 610, 612 can be used to adjust the relative positioning of the lift arm 111, which adjusts the height of the grabber 113 relative to the surface 550 the tires of the vehicle 102 are positioned on.

As shown in FIG. 6, the GUI of the controller 142 also includes a control element 604 displaying the current relative positioning of grabber 113. In some examples, the grabber 113 positioning displayed by control element 604 is the height of the center of the ends 126a, 126b of the gripper arms 116a, 116b relative to the surface 550 on which the tires of the refuse collection vehicle are positioned.

The GUI of the controller 142 includes a first control element 606 for raising the lift arm 111. In some examples, each time an operator selects the first control element 606, the lift arm 111 is raised to increase the height the grabber 113 relative to the surface 550 on which the vehicle 102 is positioned by a defined incremental distance. For example, if the incremental travel distance is 1 inch, an operator may raise the lift arm 111 and increase the height of the grabber 113 relative to the surface 550 on which the vehicle 102 is positioned by three inches by selecting the first control element 606 three times. In some examples, the height of the grabber 113 relative to the surface 550 on which the vehicle 102 is positioned can be increased in increments of 2.5 inches by raising the lift arm 111 using control element 606. In some implementations, the height of the grabber 113 can be increased to a maximum height of approximately 39 inches above the surface 550 on which the vehicle 102 is positioned using controller 142.

The GUI of the controller 142 includes a second control element 608 for lowering the lift arm 111. In some examples, each time an operator selects the second control element 608, the lift arm 111 is lowered to decrease the height of the grabber 113 relative to the surface 550 on which the vehicle 102 is positioned by a defined incremental distance. For example, if the incremental travel distance defined for control element 608 is 1 inch, an operator may lower the lift arm 111 and decrease the height of the grabber 113 relative to the surface on which the vehicle 102 is sitting by three inches by selecting the second control element 608 three times. In some examples, the height of the grabber 113 relative to the surface 550 on which the vehicle 102 is positioned can be decreased in increments of 2.5 inches by lowering the lift arm 111 using control element 608

The controller 142 also includes control elements 610 for automatically adjusting the relative positioning of the lift arm 111 based on preset grabber 113 heights. Control elements 610 each correspond to a height of the grabber 113 relative to the surface on which the vehicle 102 is positioned. For example, as depicted in FIG. 6, control element 610a corresponds to a preset grabber 113 height of 4 inches above the surface 550 on which the vehicle 102 is positioned, control element 610b corresponds to a preset grabber 113 height of 8 inches above the surface 550 on which the vehicle 102 is positioned, control element 610c corresponds to a preset grabber 113 height of 4 inches below the surface 550 on which the vehicle 102 is positioned, and control element 610d corresponds to a preset grabber 113 height of 8 inches below the surface 550 on which the vehicle 102 is positioned. Control elements 610 can be provided for preset heights including, but not limited to, 4 inches above the surface on which the vehicle 102 is positioned, 8 inches above the surface on which the vehicle 102 is positioned, 12 inches above the surface on which the vehicle 102 is positioned, 16 inches above the surface on which the vehicle 102 is positioned, 20 inches above the surface on which the vehicle 102 is positioned, 24 inches above the surface on which the vehicle 102 is positioned, 4 inches below the surface on which the vehicle 102 is positioned, 8 inches below the surface on which the vehicle 102 is positioned, 12 inches below the surface on which the vehicle 102 is positioned, 16 inches below the surface on which the vehicle 102 is positioned, and 20 inches below the surface on which the vehicle 102 is positioned.

In some implementations, in response to an operator's selection of one of control elements 610, the lift arm 111 is automatically adjusted such that the center of the ends 126a, 126b of the gripper arms 116a, 116b of the grabber 113 are positioned at the preset height associated with the selected control element 610. For example, in response to an operator's selection of a refuse container size using a control element 610, the current height of the grabber 113 relative to the surface 550 on which the vehicle 102 is positioned is determined based on data from arm sensor 106a, and the lift arm 111 is automatically moved up or down, based on the current grabber 113 height and the preset height associated with the selected refuse container size, until sensor 106a detects that the lift arm 111 has reached the relative positioning corresponding to a grabber 113 height equal to the preset height associated with the selected control element 610. For example, if an operator selects control element 610c, the lift arm 111 will be automatically repositioned to such that the height of the center of the ends 126a, 126b of the gripper arms 116a, 116b of the grabber 113 is equal to the preset height associated with control element 610c (i.e., 4 inches below the surface 550 the vehicle is positioned on).

In some examples, the controller 142 may include control elements 610 for automatically adjusting the relative positioning of the lift arm 111 based on a selected refuse container size. For example, one or more control elements 610 may each correspond to a particular size of refuse container 130, as defined by volume, such as a 32-gallon refuse container, a 48-gallon refuse container, a 64-gallon refuse container, and/or a 96-gallon refuse container. Controller 142 can store a relative lift arm 111 positioning corresponding to each refuse container size associated with each control element 610. For example, controller 142 can store a relative lift arm 111 positioning for each refuse container size for which the height of the grabber 113 relative the surface 550 the vehicle 102 is sitting on is optimized to engage the respective size of container 130 based on the height of the respective size of container 130.

In some implementations, in response to an operator's selection of one of control elements 610, the lift arm 111 is automatically adjusted to the stored relative position associated with the refuse container size of the selected control element 610. For example, in response to an operator's selection of a 64-gallon refuse container size using a control element 610, the current relative positioning of the lift arm 111 is determined based on data from arm sensor 106a, and the lift arm 111 is automatically moved up or down, based on the current lift arm 111 position and the stored relative lift arm 111 positioning associated with a 64-gallon refuse container size, until sensor 106a detects that the lift arm 111 has reached the stored position.

As depicted in FIG. 6, the GUI of the controller 142 also includes a reset control element 612 that allows an operator to reset the relative position of the lift arm 111 to a baseline positioning. In some implementations, the baseline positioning includes a lift arm 111 positioning such that the height of the grabber 113 is 24 inches above the surface on which the vehicle 102 is positioned. In some implementations, the baseline positioning of the lift arm 111 may be adjusted or set by an operator 150 using a controller (such as controller 142).

In response to an operator's selection of the reset control element 612, the current relative positioning of the lift arm 111 is determined based on data from arm sensor 106a, and the lift arm 111 is automatically moved up or down, based on the current lift arm 111 positioning and the baseline positioning, until sensor 106a detects that the lift arm 111 has reached the baseline positioning. For example, if the baseline positioning of the lift arm 111 positions the grabbers 24 inches above the surface 550 on which the vehicle 102 is positioned, and the current positioning of the lift arm 111, as detected by sensor 106, corresponds to a grabber 113 height of 26 inches above the surface 550 on which the vehicle 102 is positioned, a selection of the reset control element 612 will cause the lift arm 111 to be lowered until the height of the grabber 113 is 24 inches above the surface 550 on which the vehicle 102 is positioned, as detected by sensor 106a.

Control element 604 displaying the current grabber 113 height is automatically updated in response to each adjustment of the position of lift arm 111. For example, if the current grabber 113 is 8 inches below the surface 550 on which the vehicle 102 is positioned, and the operator increases the grabber 113 height by 5 inches by using control element 606 to raise the lift arm 111, touchscreen element 604 will be updated to display 3 inches below the surface 550 on which the vehicle 102 is positioned as the current grabber 113 height.

In some implementations, the controller 142 can be used to adjust the height of the grabber 113 within a predetermined range. For example, controller 142 can be used to adjust the relative positioning of the lift arm 111 such that the height of the grabber 113 can be adjusted between 39 inches above the surface 550 on which the vehicle 102 is positioned to 20 inches below the surface 550 on which the vehicle 102 is positioned. As described in further detail herein, in some examples, the range of grabber 113 height adjustment using controller 142 may be reduced based on the angular positioning of the grabber 113. For example, in some implementations, the height of the grabber 113 can be adjusted between 18 inches above the surface 550 on which the vehicle 102 is positioned to 30 inches above the surface 550 on which the vehicle 102 is positioned.

In some examples, an assembly including a cylinder 250 and a piston 252 is used to raise and lower the lift arm 111. For example, retraction of the piston 252 into the cylinder 250 will cause the lift arm 111 to be lowered from its current relative positioning. Extension of the piston 252 outward from the cylinder 250 causes the lift arm 111 to be raised from its current relative positioning.

In some examples, the lift arm 111 continues to be raised or lowered until the amount of height adjustment of the grabber 113 selected by the operator using the controller 142 is reached. In some examples, the amount of height adjustment of the grabber 113 and the current height of the grabber 113 is detected by a sensor 106a coupled to the cylinder 250 coupled to the lift arm 111. In some implementations, the sensor 106a for detecting lift arm 111 positioning and grabber 113 height is located in a cylinder 250 coupled to the lift arm 111. In some examples, sensor 106a includes two sensors, with a first sensor being located inside a cylinder used for raising the lift arm 111 and a second sensor being located inside a cylinder used for extending the lift arm 111. In some implementations, the sensor for detecting lift arm 111 positioning and grabber 113 height is located on the outside of a housing containing a cylinder 250 coupled to the lift arm 111. In some examples, the sensors 106a used to detect lift arm 111 positioning and grabber 113 height are magnetostrictive sensors. As previously discussed, in some examples, feedback provided by the sensors for detecting lift arm 111 movement can be used to determine the relative position of the grabber 113. Sensor(s) 106a can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof.

In some implementations, a first controller can be used to set the baseline lift arm positioning relative to the surface on which the refuse collection vehicle 102 is positioned, and a second controller can be used to adjust the height of the lift arm 111 within a range around the baseline lift arm positioning. For example, in some implementations a touchscreen display controller (such as controller 542) is used to set the baseline lift arm positioning (e.g., positioning 802 depicted in FIGS. 8A and 8B). Once the baseline lift arm positioning is set, a second controller can be used to adjust the height of the lift arm 111 within a predetermined range. For example, after setting the baseline positioning, a driver of vehicle can use a pushbutton controls (e.g., pushbutton 540a and 540b of FIGS. 8A-8E) to adjust the height of the lift arm 111 up or down in set increments within a range outside the baseline positioning. In some implementations, after setting the baseline positioning, a driver of vehicle can use a joystick controller (e.g., 745 of FIGS. 8A-8E) to fluidly adjust the height of the lift arm 111 within a range outside the baseline positioning. For example, the driver of the vehicle can pull back or push forward on the joystick controller 745 to move the arm height up or down, respectively, within the confines of relative positioning range of 6 inches above the baseline positioning to 6 inches below the baseline positioning.

In some implementations, the height of the lift arm 111 is automatically returned to the baseline positioning 802 following completion of a dump cycle. For example, based on data received from the body sensors 160 on the vehicle 102, an onboard computing device 132 can determine that the vehicle has completed a dump cycle and has released the refuse container 130 to the ground 550. In response to detecting that the dump cycle is complete, onboard computing device 132 can determine the current relative positioning of the lift arm 111 based on data received from the body sensors 106a and 106b, and determines the amount of lift arm 111 travel required to reposition the lift arm 111 in the baseline positioning. Based on this determination, the lift arm 111 is automatically moved the amount required to reposition the lift arm 111 in the baseline positioning.

Figure 8A:
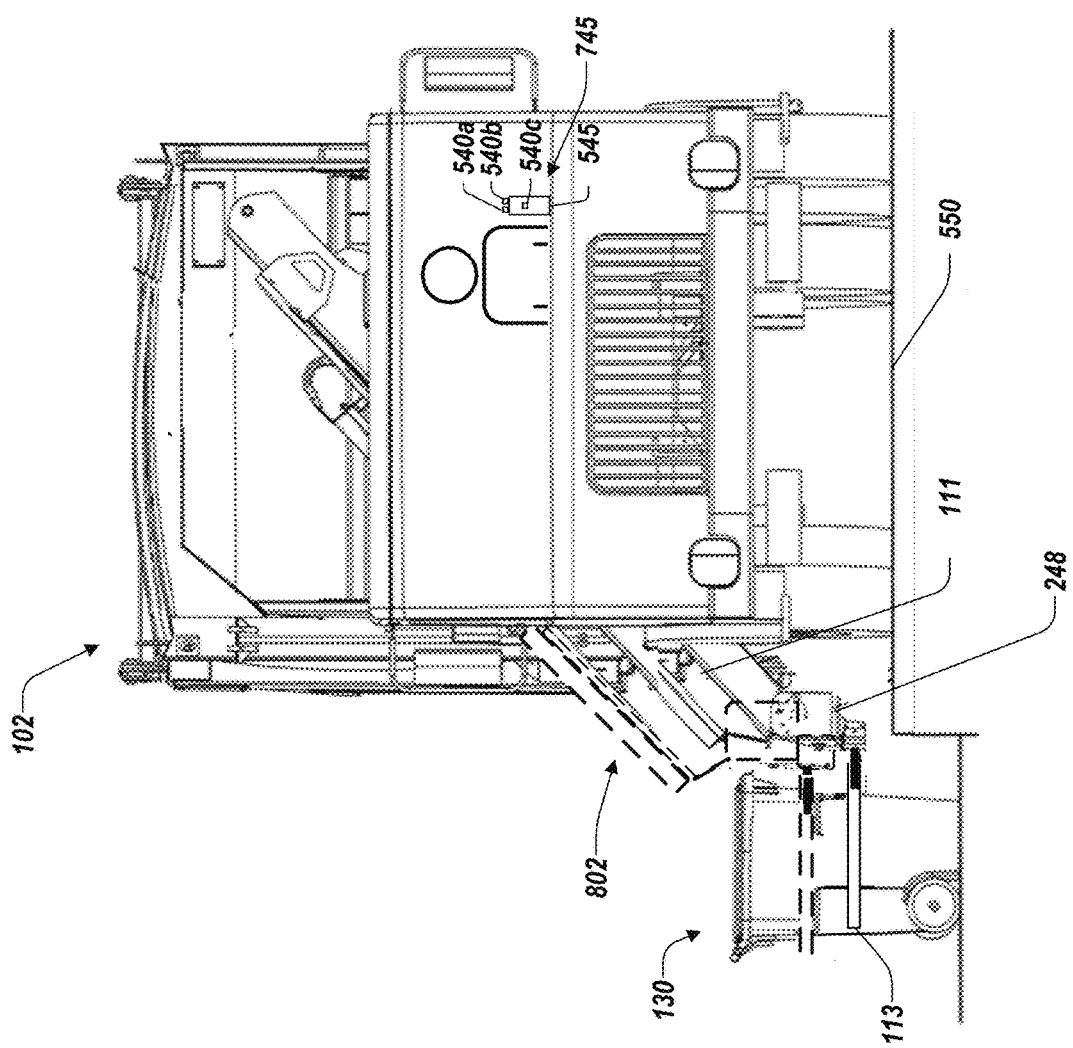
FIGS. 8A-8E depict an example refuse collection vehicle engaging a refuse container.
Figure 8B:
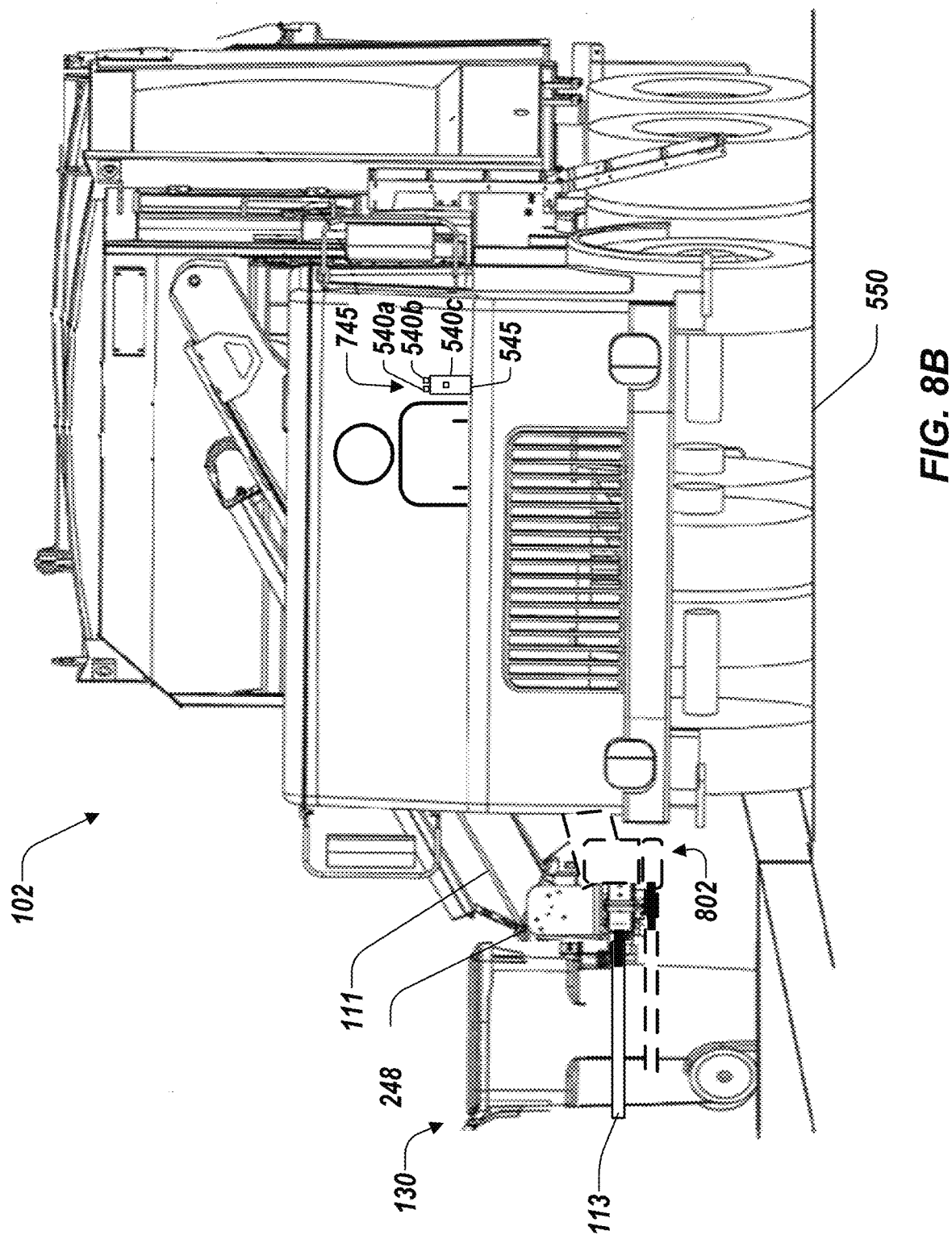

Adjustment of the position of the lift arm 111 may allow for greater control and stability in engaging a refuse 130. For example, as depicted in FIG. 8A, when a refuse container 130 to be engaged by the refuse collection vehicle 102 is positioned on a surface that is below street grade 550, the lift arm 111 can be lowered from the baseline lift arm positioning 802 in order to improve engagement of the refuse container 130. As depicted in FIG. 8B, whenever a refuse container 130 is positioned on a surface above street grade 550, the lift arm 111 can be raised from the baseline lift arm positioning 802 in order to improve engagement of the refuse container 130.

A controller 142 may also be provided to adjust the maximum speed of the lift arm 111 movement. In some examples, the controller 142 is communicably coupled to the cylinder 250 and piston 252 assembly such that the controller 142 controls the speed of extension and retraction of the piston 252 from the cylinder 250, which controls the speed at which the lift arm 111 is raised and lowered. In some implementations, the controller 142 is provided as a touchscreen display, such as touchscreen 602 of FIG. 6, and the maximum speed of the lift arm 111 may be adjusted using one or more control elements displayed on the touchscreen display. For example, the controller 142 for adjusting lift arm 111 speed can be provided as a touchscreen display that includes a first touchscreen element for increasing the maximum speed of lift arm 111 movement in increments of a set amount and a second touchscreen element for decreasing the maximum speed of lift arm 111 movement in increments of a set amount. In some examples, each time the user selects a control element of the controller 142, the maximum speed of the lift arm 111 movement is adjusted by the predetermined incremental amount. In some examples, after setting the maximum speed for the lift arm 111 movement using controller 142, an operator can move the lift arm 111 using a joystick 545, and the speed of the lift arm 111 movement is proportional to movement of the joystick 545. For example, if an operator 150 sets a maximum speed for lift arm 111 movement using controller 142 and engages the joystick 545 50% of full engagement, the lift arm 111 will be moved at a rate equal to 50% of the maximum speed set with controller 142.

Figure 7:
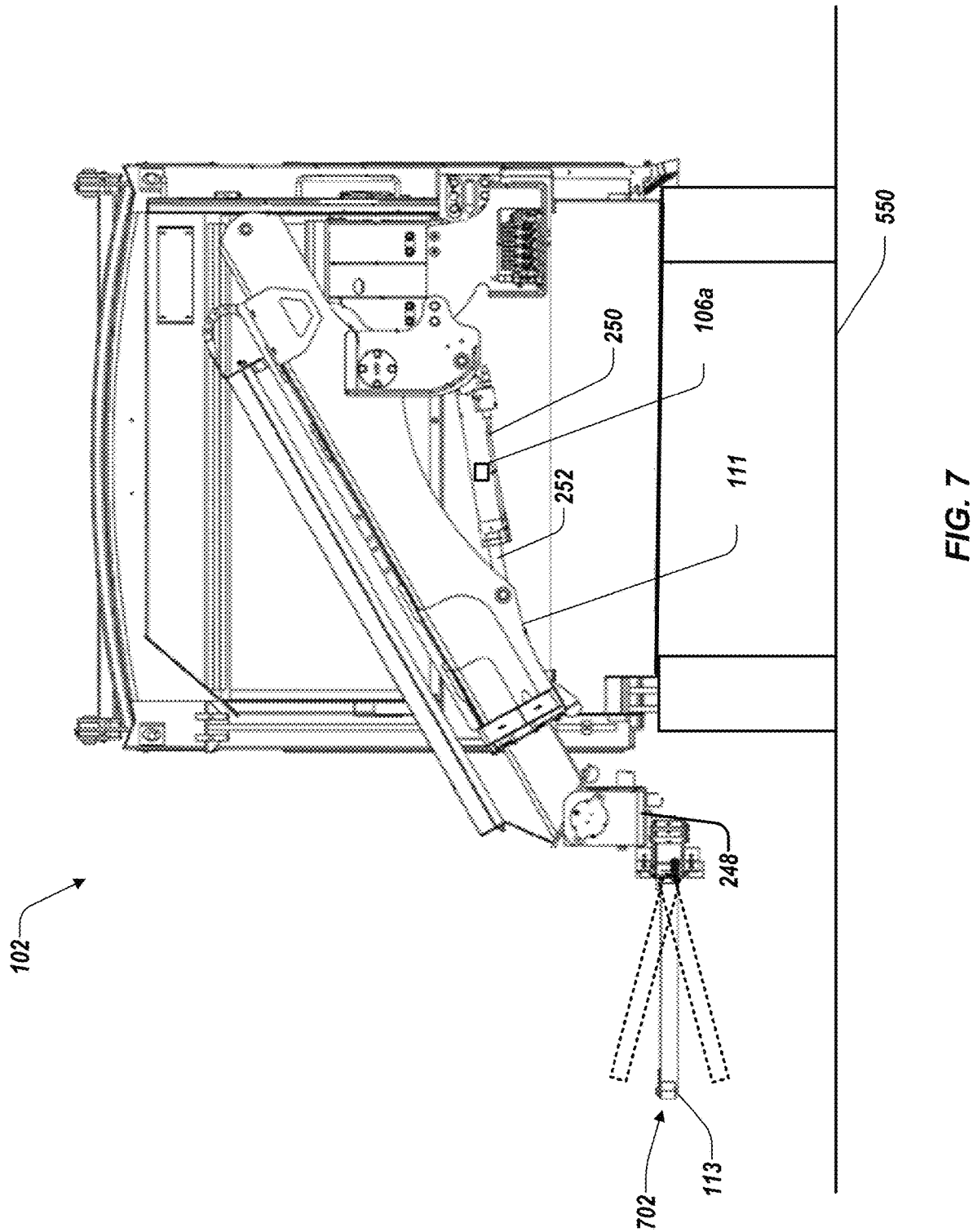
FIG. 7 depicts a schematic of an example lift arm and an example grabber of a refuse collection vehicle.

As depicted in FIG. 7, the angle of the grabber 113 is adjustable. For example, the angle of the grabber 113 can be adjusted above or below a baseline angular position 702. In some implementations, the baseline angular position 702 of the grabber 113 is in a range of −45 degrees to 45 degrees relative to the surface 550 on which the vehicle 102 is positioned. In some implementations, the baseline angular position 702 of the grabber 113 is in a range of −15 degrees to 30 degrees relative to the surface 550 on which the vehicle 102 is positioned. In some implementations, the baseline angular position 702 for grabber 113 corresponds to the longitudinal axis of the gripper arms 116a, 116b of the grabber 113 being substantially parallel to the surface 550 on which the vehicle 102 is positioned. In some implementations, the baseline angular position 702 may be set by an operator 150 using a controller 745.

Figure 8C:
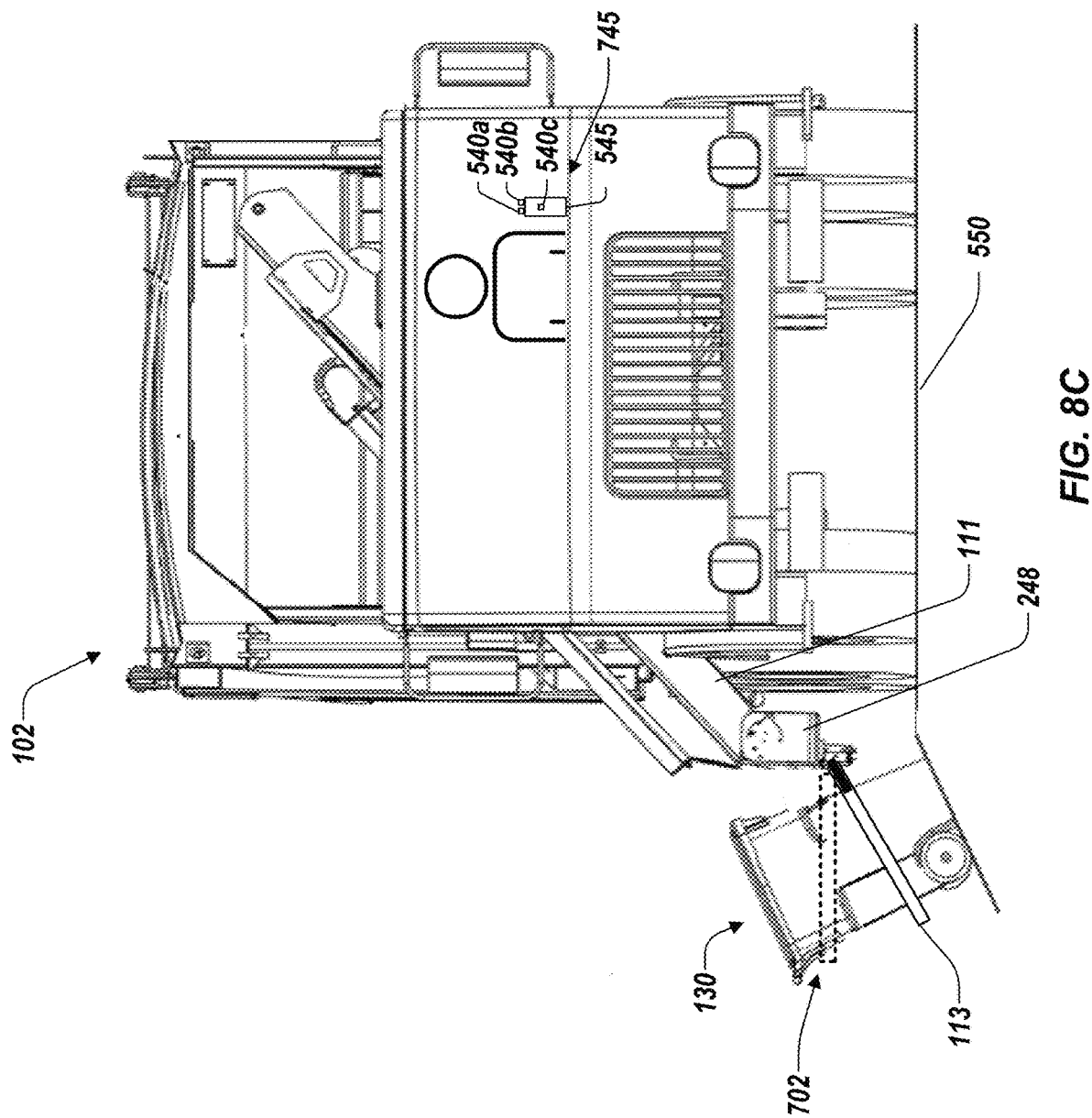
Figure 8D:
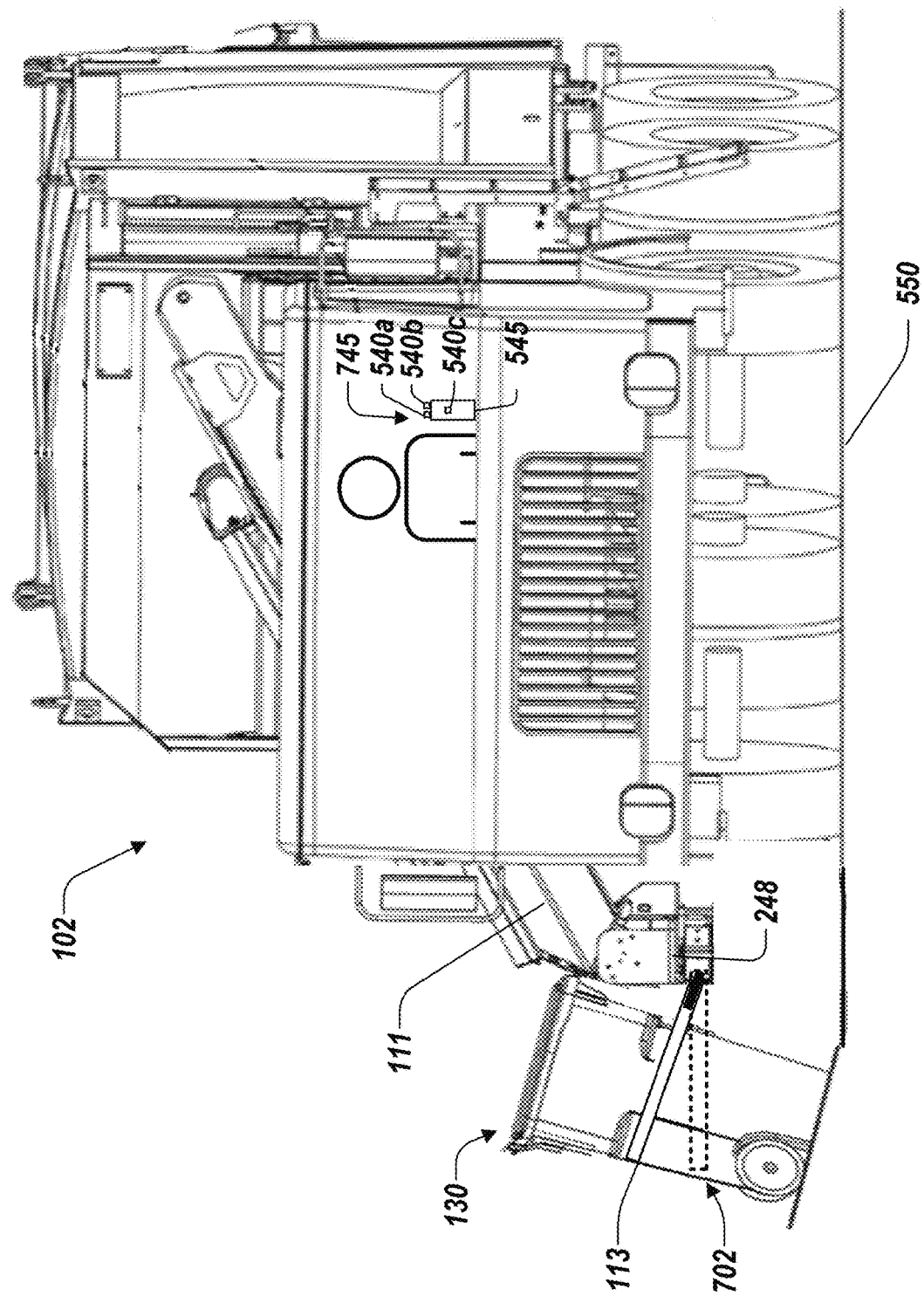

Adjustment of the angle of the grabber 113 may allow for greater control and stability in engaging a refuse 130. For example, FIG. 8C depicts a refuse container 130 positioned on a surface that is sloping downward from street grade 550. As depicted in FIG. 8C, the grabber 113 can be angled downward from baseline angular position 702 such that the grabber 113 is substantially perpendicular to a side of the refuse container 130 for improved engagement of the refuse container 130. FIG. 8D depicts a refuse container 130 positioned on a surface sloping upward from street grade 550. As depicted in FIG. 8D, the grabber 113 can be angled upward from a baseline angular position 702 such that the grabber 113 is substantially perpendicular to the side of refuse container 130 for improved engagement of the refuse container.

A controller 745 is provided for adjustment of the angle of the grabber 113 relative to the refuse collection vehicle 102. In some examples, the controller 745 can be used to adjust the angle of the grabber 113 within a predetermined range. For example, controller 745 can be used to adjust the angle of the grabber 113 30 degrees above the baseline angular position 702 and 30 degrees below the baseline angular position 702. As will be discussed in further detail herein, in some implementations, the controller 745 can be used to adjust the angle of the grabber 113 30 degrees above the baseline angular position 702 and 15 degrees below the baseline angular position 702 when the grabber 113 is positioned below a threshold height.

In some examples, the controller 745 is communicably coupled to a rotary actuator that is coupled to the grabber 113. As depicted in FIGS. 8A-8E, the controller 745 for adjusting the angle of the grabber 113 can include a first push button 540a and a second push button 540b. The first push button 540a is configured to adjust the angle of the grabber 113 upwards relative to the surface on which the refuse collection vehicle 102 is positioned. The second push button 540b is configured to adjust the angle of the grabber 113 downward relative to the surface on which the refuse collection vehicle 102 is positioned. In some implementations, buttons 540a, 540b are provided as a spring-loaded, momentary contact button. In some examples, buttons 540a, 540b are provided as a potted and sealed push button with finger guards.

In some examples, each time the operator presses a push button 540a, 540b of the controller 745, the angle of the grabber 113 is adjusted by a predetermined incremental amount. For example, if the incremental amount is 1 degree of angular movement, an operator can press the first push button 540a three times to adjust the angle of the grabber 113 upwards from its current position by three degrees. Similarly, for example, the operator can press the second push button 540b three times to adjust the angle of the grabber 113 downwards from its current position by three degrees. In some examples, the angle of the grabber 113 can be adjusted up or down using the controller 745 in increments of one degree to five degrees.

In some implementations, the angle of the grabber 113 can be adjusted continuously at a preset speed, rather than is increments of set degrees, by pressing and holding one of push button controls 540. For example, a first push button 540a located in the cab of the vehicle can be used to continuously adjust the angle of the grabber 113 upwards and a second push button 540b located in the cab of the vehicle can be used to continuously adjust the angle of the grabber 113 downwards. In some examples, if an operator presses and holds button 540a, the grabber 113 is rotated upwards continuously at a preset speed, up to a maximum upwards angle, until the operator releases the button 540a. In some examples, if an operator presses and holds button 540b, the grabber 113 is rotated downwards continuously at a preset speed, down to a maximum downwards angle, until the operator releases the button 540b.

The controller 745 can also include a third push button 540c to reset the angle of the grabber 113 back to the baseline angular position 702. An operator 150 can press push button 540c to automatically reset the angle of the grabber 113 back to the baseline angular position 702. In response to an operator engaging the third push button 540c, the current angular position of the grabber 113 is determined based on data from grabber sensor 106b, and the grabber 113 is automatically tilted upwards or downwards, based on the current angular position of the grabber 113 and the baseline angular position 702, until the grabber sensor 106b detects that the grabber 113 has reached the baseline angular position 702.

In some implementations, the relative position of the lift arm 111 and the angle of the grabber 113 are coordinated. Interlocks may be provided to limit the range that an operator can adjust the angular position of the grabber 113 using controller 745 based on the current relative positioning of the lift arm 111. For example, when the lift arm 111 is lowered below a threshold height, the range that the angle the grabber 113 can be adjusted below the baseline angular position 702 using controller 745 is reduced. In some implementations, once the lift arm 111 is lowered below a threshold height, the control push button 540b is disengaged to prevent an operator from adjusting the angle of the grabber 113 below the baseline angular position 702. Restricting or eliminating the operator's ability to adjust the grabber 113 angle below the baseline angular position 702 when the lift arm 111 is positioned below a threshold height reduces the risk of damage to the vehicle 102 by preventing the grabber 113 from hitting the ground.

In some implementations, the controller 745 can be used to adjust the angle of the grabber 113 freely from about 90 degrees above and to about 90 degrees below the angle of the surface 550 on which the vehicle 102 is positioned. In some examples, a controller 745 can be used to adjust the angle of the grabber 113 up and down between 75 degrees above and about 75 degrees below the angle of the surface on which the vehicle 102 is positioned.

Figure 8E:
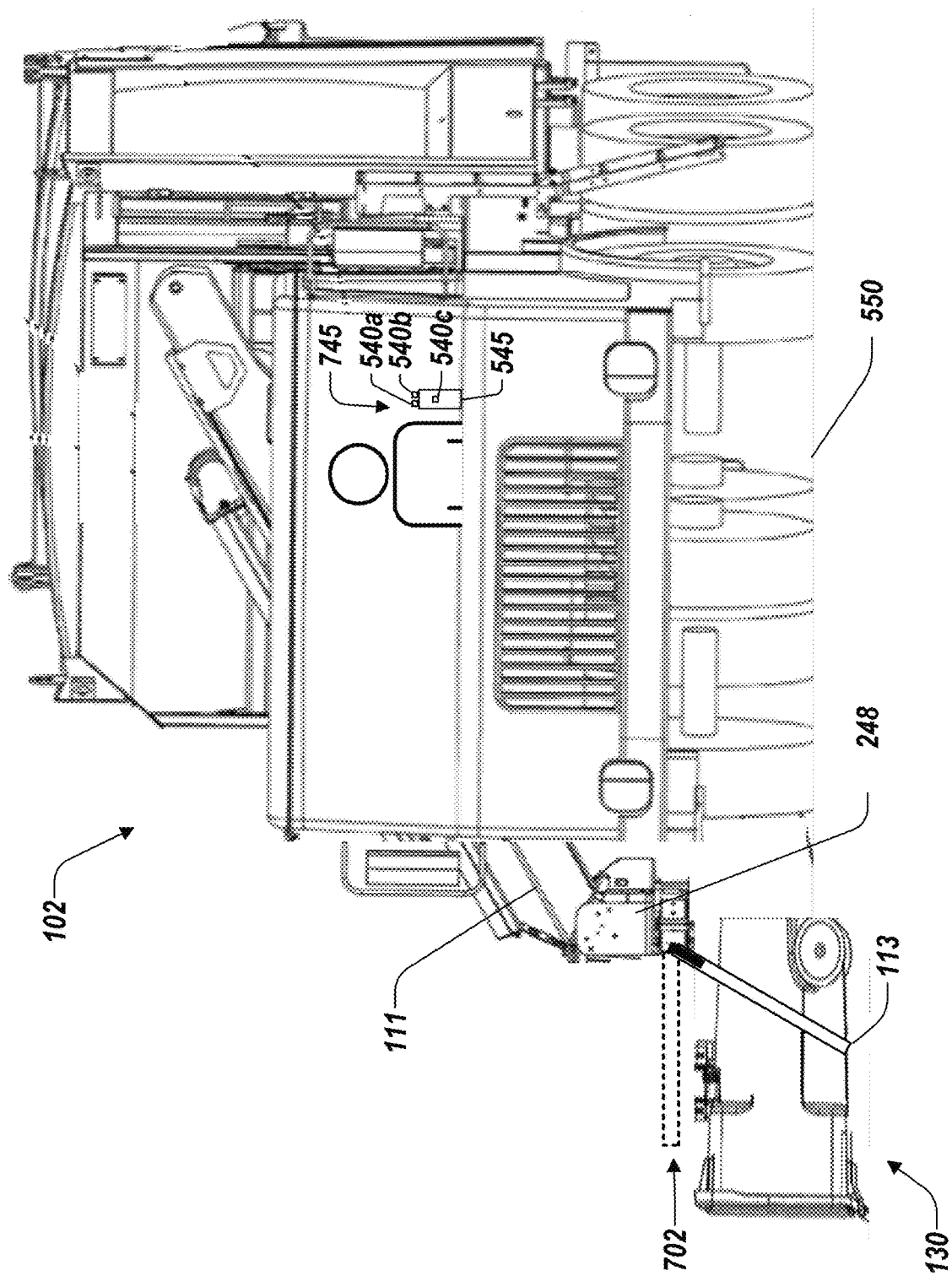

As depicted in FIG. 8E, the free rotation feature of the controller 745 can be used to rotate the grabber to engage a refuse container 130 that has fallen over or is otherwise outside the reach of the grabber 113 within the predetermined angle range of the standard controller 745 settings. In some examples, the operator can engage the free rotation function by pressing and holding one of the push control buttons 540a, 540b for a threshold amount of time (e.g., 5 seconds). In some implementations, the free rotation function can be engaged by pressing a particular push control button designated for free rotation control (e.g., 540c).

Once the free rotation function is engaged, the operator 150 can use the first push control button 540a to adjust the angle of the grabber 113 upwards to about 90 degrees above the angle of the surface 550 on which the vehicle 102 is positioned such that the grabber 113 is pointing upwards and is substantially perpendicular with the surface 550 on which the vehicle 102 is sitting. In free rotation mode, the operator 150 can use the second push control button 540b to adjust the angle of the grabber 113 downward to about 90 degrees below the angle of the surface 550 on which the vehicle 102 is positioned such that the grabber 113 is pointing downwards and substantially perpendicular with the surface 550 on which the vehicle 102 is sitting. In some examples, the push control buttons 540a, 540b function as continuous push control buttons in free rotation mode such that the angle of the grabber 113 is adjusted continuously as long as one of the buttons 520 is engaged, as described above. In some implementations, the push control button 540a, 540b can be used in free rotation mode to adjust the angular position of the grabber 113 in defined increments within the free rotation angular range.

In some implementations, the controller 745 for the grabber 113 is returned to a standard mode from free rotation mode by pressing the first push control button 540a. In some examples, the controller 745 for the grabber 113 can be returned to a standard mode from free rotation mode by pressing a third push control button 560c. Pressing the third push control button 560c also resets the angle of the grabber 113 to the baseline angular position 702.

Certain features of the refuse collection vehicle may be disabled while the controller 745 for the grabber 113 is in free rotation mode. For example, automatic levelling of the grabber 113 while the vehicle 102 is performing a dump cycle may be disabled when the grabber 113 is in free rotation mode. In some implementations, interlocks coordinating the range of angular movement of the grabber 113 with the height of the lift arm 111 are disengaged when the grabber 113 is in free rotation mode.

In some implementations, a first controller can be used to set the baseline angular position 702 for the grabber 113, and a second controller can be used to adjust the angle of the grabber 113 within a range around the baseline angular position 702. For example, in some implementations a touchscreen display controller (such as controller 542) is used to set the baseline angular position 702. Once the baseline angular position 702 is set, a second controller can be used to adjust the angle of the grabber 113 within a predetermined range. For example, after setting the baseline positioning, a driver of vehicle can use press and hold pushbutton on a joystick controller (e.g., pushbutton 540a on joystick 745 of FIGS. 8A-8E) and, while maintaining engagement of the pushbutton, move the joystick controller 745 left or right to change the angle of the grabber upwards or downward relative to the surface 550 the tires of the vehicle 102 are positioned on. In some implementations, the joystick controller 745 can be used to adjust the angle of the grabber 113 within a predetermined range around the baseline angular position 702 (e.g., 6 degrees above the baseline angular position 702 to 3 degrees below the baseline angular position 702.

In some implementations, the angle of the grabber 113 is automatically returned to the baseline angular position 702 following completion of a dump cycle. For example, based on data received from the body sensors 160 on the vehicle 102, an onboard computing device 132 can determine that the vehicle has completed a dump cycle and has released the refuse container 130 to the ground 550. In response to detecting that the dump cycle is complete, onboard computing device 132 can determine the current angular positioning of the grabber 113 based on data received from the grabber sensor 106b, and determines the amount angular adjustment of the grabber 113 required to reposition the grabber 113 in the baseline angular position 702. Based on this determination, the grabber is automatically moved the amount required to reposition the grabber 113 in the baseline angular position 702.

In some implementations, the lift arm 111 and the grabber 113 of the vehicle 102 can be automatically positioned to engage a refuse container 130 detected based on one or more images captured by a camera 112 on the vehicle 102 and processed by a computing device (e.g. computing device 132). A computing device can receive one or more images from camera 112 and process the images using machine learning based image processing techniques to detect the presence of a refuse container 130 in the image. For example, a computing device can receive an image from camera 112 and determine, based on machine learning image processing techniques, that the vehicle 102 is positioned within a sufficient distance to engage a refuse container 130. In some implementations, a video feed of the refuse container 130 is provided by the side view camera 112 and transmitted to a computing device for machine learning based image processing techniques to detect the presence of a refuse container 130. U.S. patent application Ser. No. 16/781,857 filed Feb. 4, 2020 discloses systems and methods for determining the location of a refuse container using image processing techniques. The entire content of U.S. patent application Ser. No. 16/781,857 is incorporated by reference herein.

In some examples, a computing device can process the images provided by camera 112 to determine a location of each side of a detected refuse container 130. In some examples, the locations of the sides of the detected refuse container 130 determined by image processing are provided as GPS coordinates, and based on these coordinates, the width of the refuse container 130 can be determined. In some examples, the width of the refuse container 130 is determined by processing the image using machine learning techniques to detect two opposing sides of the refuse container 130 and determine the distance between the sides.

In some examples, a computing device can process the images provided by camera 112 to determine a location of one or more corners of the detected refuse container 130. The detected corners of the detected refuse container 130 can be provided as GPS coordinates, and based on these coordinates, the height and angular position of the refuse container 130 relative to the vehicle 102 can be determined. In some implementations, a distance value from the closest point of the detected container to the grabber beam 248 is determined based on a global coordinate of the camera location in relation to the location of the grabber beam 248.

In response to detecting the presence of a refuse container 130 and determining the position of the container 130 relative to the vehicle 102 based on image processing of an image captured by camera 112, a signal is sent to a computing device 132 of the vehicle 102 to automatically adjust the position of the lift arm 111 and/or the position of grabber 113 of the vehicle 102. For example, a signal is sent to the computing device 132 of the vehicle 102 to automatically adjust the height of the lift arm 111 and the angular position 113 to engage a refuse container 130 at the position determined based on the machine learning image processing of the image of the container 130.

Upon receiving a signal conveying the position of a refuse container 130 determined based on processing an image of the container 130, an onboard computing device 132 determines the relative position of lift arm 111 based on data received from arm sensor 106a. Based on the current lift arm 111 position, the computing device 132 determines the amount of lift arm 111 travel required to adjust the lift arm 111 from the current position to an optimal position for engaging the refuse container 130 at the position detected based on image processing. The lift arm 111 is automatically raised or lowered, based on the current lift arm 111 position and the detected refuse container 130 position, until the lift arm sensor 106a detects that the lift arm 111 has reached the optimal position for engaging the refuse container 130.

Upon receiving a signal conveying the position of a refuse container 130 determined based on processing an image of the container 130, an onboard computing device 132 determines the current angular position of the grabber 113 based on data received from grabber sensor 106b. Based on current angular position of the grabber 113, the computing device 132 determines the amount of rotation of the grabber 113 required to adjust the angular position of the grabber 113 from the current angular position to an optimal angle for engaging the refuse container 130 at the position detected based on image processing. The grabber 113 is automatically tilted upwards or downwards, based on the current angular position of the grabber 113 and the detected refuse container 130 position, until the grabber sensor 106b detects that the angular position of the grabber 113 is equal to an optimal angle for engaging the refuse container 130.

The automatic positioning of the lift arm 111 and/or the grabber 113 of the refuse collection vehicle 102 based on processing image(s) of the refuse container 130 by a computing device can be conducted automatically with minimal or no operator involvement. For example, as described above, the relative positioning the lift arm 111 and the grabber 113 can be automatically adjusted without operator input in response to receiving a signal from a computing device conveying the position of the refuse container 130 as determined by processing an image of the container 130 received from camera 112. In some examples, the position of the lift arm 111 and the grabber 113 are automatically adjusted based on receiving data conveying the position of the refuse container 130 and in response to an operator 150 of the vehicle manually engaging a switch to initiate a dump cycle (as depicted in FIGS. 2A-2C). In some implementations, the switch to initiate the dump cycle is provided as one or more foot pedals positioned on the floorboard of the vehicle 102. U.S. patent application Ser. No. 16/781,857 filed Feb. 4, 2020 discloses foot pedals for initiating and controlling a dump cycle. The entire content of U.S. patent application Ser. No. 16/781,857 is incorporated by reference herein.

In some implementations, the refuse collection vehicle 102 includes one or more container detection sensors 180a, 180b, 180c and the lift arm 111 and the grabber 113 are automatically positioned to engage a refuse container 130 based on data received from the one or more container detection sensors 180a, 180b, 180c. As depicted in FIGS. 3A-3C, the vehicle 102 can include one or more container detection sensors 180a, 180b, 180c. In some implementations, the container detection sensors 180a, 180b, 180c are coupled to the grabber beam 248 of the refuse collection vehicle 102. In some examples, the vehicle 102 includes three refuse container sensors 180a, 180b, 180c. In some implementations, as depicted in FIGS. 3A-3C, each of the refuse container sensors 180a, 180b, 180c is coupled to the grabber beam 248 proximate the grabber 113 and is positioned at a different angle. For example, a first sensor 180a can be positioned perpendicular to a longitudinal axis of the grabber beam 248, a second sensor 180b can be positioned at a 30 degree angle relative to the longitudinal axis of the grabber beam 248, and a third sensor 180c can be positioned at a 45 degree angle relative to the longitudinal axis of the grabber beam 248. In some implementations, the vehicle 102 includes two refuse container sensors (e.g., sensors 180a and 180c). Multiple container detection sensors 180a, 180b, 180c can be implemented to provide redundancy in refuse container detection.

In some implementations, the one or more container detection sensors 180a, 180b, 180c are contained within an enclosure. For example, the container detection sensors 180a, 180b, 180c can be contained within a metal enclosure. Placing the container detection sensors 180a, 180b, 180c in an enclosure can help protect the container detection sensors 180a, 180b, 180c from debris.

Container detection sensors 180a, 180b, 180c for detecting the position of a refuse container 130 proximate the vehicle 102 can include, but are not limited to, an analog sensor, a digital sensor, a CAN bus sensor, a magnetostrictive sensor, a RADAR sensor, a LIDAR sensor, a laser sensor, an ultrasonic sensor, an infrared (IR) sensor, a stereo camera sensor, a three-dimensional (3D) camera, an in-cylinder sensor, or a combination thereof. In some examples, container detection sensors 180a, 180b, 180c include optical sensors. In some implementations, container detection sensors 180a, 180b, 180c include two or more analog ultrasonic sensors coupled to the grabber beam 248.

A computing device (such as onboard computing device 132 of FIG. 1) can receive data from the container detection sensors 180a, 180b, 180c indicating the presence and position of a refuse container 130. In some implementations, the position of lift arm 111 and/or the position of the grabber 113 are automatically positioned to updated positions provided by the operator 150 using one or more controllers (such as controller 642 and controller 142) in response to a computing device receiving data from the container detection sensors 180a, 180b, 180c indicating the presence of a refuse container 130. For example, computing device 132 can receive data from the container detection sensors 180a, 180b, 180c and determine, based on the data received, that the vehicle 102 is positioned within a distance sufficiently close to a refuse container 130 to engage the refuse container 130. In some examples, in response to a determination by the computing device 132 that the vehicle 102 is in proximity to engage a refuse container, the lift arm 111 and the grabber 113 are automatically moved to a position selected by the operator 150 using controller 642 and controller 142.

In some implementations, a computing device can determine a distance value from the closest point of the detected container 130 to the grabber beam 248 based on the data received from the container detection sensors 180a, 180b, 180c. For example, computing device 132 can receive data from the container detection sensors 180a, 180b, 180c and determine, based on the data, that the vehicle 102 is positioned within a sufficient distance to engage a refuse container 130. In some examples, the speed of travel of the lift arm 111 is automatically changed to a default speed for container engagement in response to a determination that the vehicle 102 is within a threshold distance of the refuse container 130 based on the data received from container detection sensors 180a, 180b, 180c.

In response to the container detection sensors 180a, 180b, 180c detecting the presence of a refuse container 130 and the computing device 132 determining the position of the detected container 130 relative to the vehicle 102 based on data received from the container detection sensors 180a, 180b, 180c, a signal is sent to the computing device 132 of the vehicle 102 to automatically adjust the relative position the lift arm 111 and/or the grabber 113. For example, a signal is sent to the computing device 132 of the vehicle 102 to automatically adjust the height of the lift arm 111 and/or the angular position of the grabber 113 based on the data received from the container detection sensors 180a, 180b, 180c. For example, upon receiving a signal conveying the a distance value from the closest point of the detected container 130 to the grabber beam 248 as determined based on data captured by the container detection sensors 180a, 180b, 180c, an onboard computing device 132 determines the current relative positioning of the lift arm 111 and grabber 113 based on data received from the body sensors 106a and 106b, and determines the amount of lift arm 111 travel and/or angular adjustment of the grabber 113 required to engage the detected refuse container 130.

The automatic positioning of the lift arm 111 and the grabber 113 of the refuse collection vehicle 102 based on data captured by the container detection sensors 180a, 180b, 180c and processed by a computing device 132 can be conducted automatically with minimal or no operator involvement. For example, as described above, the relative positioning the lift arm 111 and the angular position of the grabber 113 can be automatically adjusted without operator input in response to receiving a signal from a computing device conveying the position of the refuse container 130 as determined by data captured by the container detection sensors 180a, 180b, 180c. In some examples, the lift arm 111 and the grabber 113 are automatically adjusted based on receiving data conveying the position of the refuse container 130 and in response to an operator 150 of the vehicle manually engaging a switch to initiate a dump cycle (as depicted in FIGS. 2A-2C).

Figure 9:
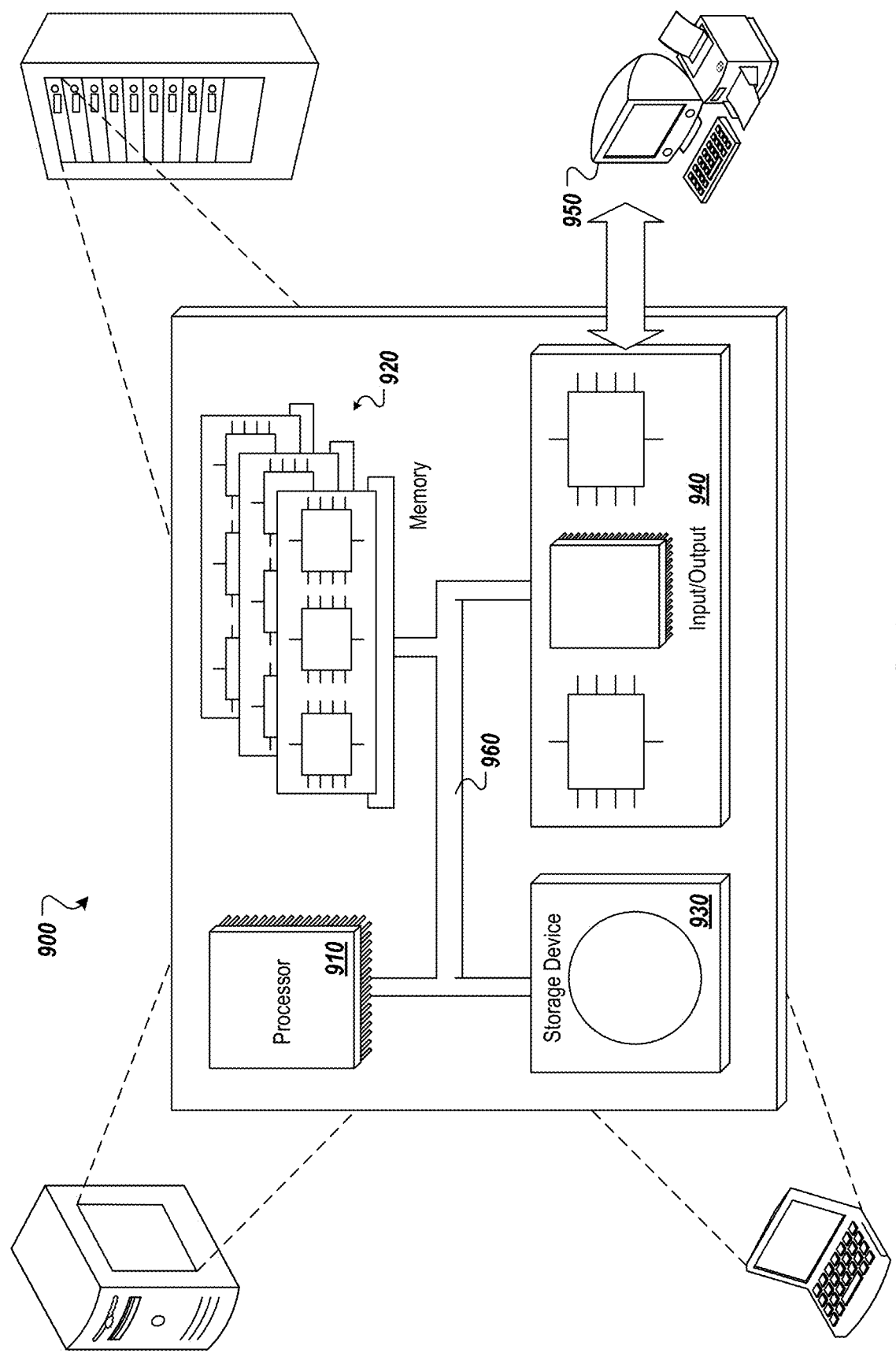
FIG. 9 depicts an example computing system.

FIG. 9 depicts an example computing system, according to implementations of the present disclosure. The system 900 may be used for any of the operations described with respect to the various implementations discussed herein. For example, the system 900 may be included, at least in part, in one or more of the onboard computing device 132, and/or other computing device(s) or system(s) described herein. The system 900 may include one or more processors 910, a memory 920, one or more storage devices 930, and one or more input/output (I/O) devices 950 controllable via one or more I/O interfaces 940. The various components 910, 920, 930, 940, or 950 may be interconnected via at least one system bus 960, which may enable the transfer of data between the various modules and components of the system 900.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A refuse collection vehicle (RCV), comprising:
a grabber operable to engage a refuse container;
a lift arm operable to lift the refuse container;
at least one camera configured to capture image data of an environment proximate the RCV; and
at least one computing device configured to:
process the image data to determine a position of the refuse container relative to the RCV;
determine that the determined position of the refuse container relative to the RCV satisfies at least one predetermined condition; and
in response to the determining that the position of the refuse container relative to the RCV satisfies the at least one predetermined condition, cause the RCV to automatically adjust at least one of a positioning of the lift arm or a positioning of the grabber based at least in part on the determined position of the refuse container and sensor data indicating at least one of the grabber positioning or the lift arm positioning, wherein, to cause the RCV to automatically adjust at least one of the positioning of the lift arm or the positioning of the grabber, the at least one computing device is configured to:
determine, based at least in part on the processed image data, a target angular position of the grabber;
determine, based at least in part on the sensor data and the target angular position of the grabber, a target position of the lift arm;
cause the grabber to move from a current angular position to the target angular position; and
cause the lift arm to move from a current position to the target position in a coordinated manner with the movement of the grabber from the current angular position to the target angular position.

2. The refuse collection vehicle of claim 1, further comprising:
at least one grabber sensor configured to collect grabber position data indicating the grabber positioning; and
at least one arm sensor configured to collect arm position data indicating the lift arm positioning.

3. The refuse collection vehicle of claim 2, wherein, to determine that the determined position of the refuse container relative to the RCV satisfies the at least one predetermined condition, the at least one computing device is configured to determine that a distance between the grabber and the refuse container is within a threshold distance.

4. The refuse collection vehicle of claim 1, wherein, to determine the target angular position of the grabber, the at least one computing device is configured to:
   determine, based at least in part on the processed image data, an angular position associated with at least one of the refuse container or a surface on which the refuse container is positioned, relative to a surface on which the RCV is positioned; and
   determine the target angular position of the grabber based at least in part on the determined angular position.

5. The refuse collection vehicle of claim 4, wherein:
   the target angular position corresponds to a position in which the grabber is angled downward relative to the surface on which the RCV is positioned when the surface on which the refuse container is positioned slopes downward relative to the surface on which the RCV is positioned; and
   the target angular position corresponds to a position in which the grabber is angled upward relative to the surface on which the RCV is positioned when the surface on which the refuse container is positioned slopes upward relative to the surface on which the RCV is positioned.

6. The refuse collection vehicle of claim 1, wherein the movement of the lift arm from the current position to the target position comprises movement that adjusts a height of the grabber relative to a surface on which the RCV is positioned.

7. A system for controlling operations of a refuse collection vehicle (RCV), the system comprising:
   at least one camera configured to capture image data of an environment proximate the RCV;
   at least one grabber sensor configured to collect grabber position data indicating a positioning of a grabber of the RCV, the grabber operable to engage a refuse container;
   at least one arm sensor configured to collect arm position data indicating a positioning of a lift arm of the RCV, the lift arm operable to lift the refuse container;
   at least one processor communicably coupled to the at least one grabber sensor and the at least one arm sensor; and
   memory communicably coupled to the at least one processor, the memory storing instructions which, when executed, cause the at least one processor to perform operations comprising:
      processing the image data to determine a position of the refuse container relative to the RCV;
      determining that the determined position of the refuse container relative to the RCV satisfies at least one predetermined condition; and
      in response to the determining that the position of the refuse container relative to the RCV satisfies the at least one predetermined condition, causing the RCV to automatically adjust at least one of a positioning of the lift arm or a positioning of the grabber based at least in part on the determined position of the refuse container and sensor data comprising at least one of the grabber position data or the arm position data, wherein the causing the RCV to automatically adjust at least one of the positioning of the lift arm or the positioning of the grabber comprises:
         determining, based at least in part on the processed image data, a target angular position of the grabber;
         determining, based at least in part on the sensor data and the target angular position of the grabber, a target position of the lift arm;
         causing the grabber to move from a current angular position to the target angular position; and
         causing the lift arm to move from a current position to the target position in a coordinated manner with the movement of the grabber from the current angular position to the target angular position.

8. The system of claim 7, wherein the determining that the determined position of the refuse container relative to the RCV satisfies the at least one predetermined condition comprises determining that a distance between the grabber and the refuse container is within a threshold distance.

9. The system of claim 7, wherein the causing the RCV to automatically adjust at least one of the positioning of the lift arm or the positioning of the grabber comprises causing angular movement of the grabber relative to the lift arm.

10. The system of claim 7, wherein the determining the target angular position comprises:
   determining, based at least in part on the processed image data, an angular position associated with at least one of the refuse container or a surface on which the refuse container is positioned, relative to a surface on which the RCV is positioned; and
   determining the target angular position of the grabber based at least in part on the determined angular position.

11. A method for controlling operations of a refuse collection vehicle (RCV), the method performed by at least one processor, the method comprising:
   capturing, using at least one camera, image data of an environment proximate the RCV;
   processing the image data to determine a position of a refuse container relative to the RCV, the RCV comprising:
      a grabber operable to engage the refuse container; and
      a lift arm operable to lift the refuse container;
   determining that the determined position of the refuse container relative to the RCV satisfies at least one predetermined condition; and
   in response to the determining that the position of the refuse container relative to the RCV satisfies the at least one predetermined condition, causing the RCV to automatically adjust at least one of a positioning of the lift arm or a positioning of the grabber based at least in part on the determined position of the refuse container and sensor data indicating at least one of grabber positioning or lift arm positioning, wherein the causing the RCV to automatically adjust at least one of the positioning of the lift arm or the positioning of the grabber comprises:
      determining, based at least in part on the processed image data, a target angular position of the grabber;
      determining, based at least in part on the sensor data and the target angular position of the grabber, a target position of the lift arm;
      causing the grabber to move from a current angular position to the target angular position; and
      causing the lift arm to move from a current position to the target position in a coordinated manner with the movement of the grabber from the current angular position to the target angular position.

12. The method of claim 11, wherein the determining that the determined position of the refuse container relative to the RCV satisfies the at least one predetermined condition comprises determining that a distance between the grabber and the refuse container is within a threshold distance.

13. The method of claim 11, wherein the causing the RCV to automatically adjust at least one of the positioning of the lift arm or the positioning of the grabber comprises causing angular movement of the grabber relative to the lift arm.

14. The method of claim 11, wherein the causing the lift arm to move from the current position to the target position comprises causing the lift arm to move so as to adjust a height of the grabber relative to a surface on which the RCV is positioned.

\* \* \* \* \*